United States Patent

Fredd et al.

[15] 3,654,962
[45] Apr. 11, 1972

[54] VALVES

[72] Inventors: John V. Fredd, Celina; Jack W. Tamplen, Dallas, both of Tex.

[73] Assignee: Otis Engineering Corporation, Dallas, Tex.

[22] Filed: Oct. 3, 1969

[21] Appl. No.: 863,524

[52] U.S. Cl. ........................137/625.11, 251/212, 251/314, 251/315, 251/325, 251/327, 251/DIG. 1

[51] Int. Cl. ......................F16k 5/02, F16k 5/04, F16k 5/06, F16k 11/14

[58] Field of Search................137/625.11, 614.17; 251/210, 251/DIG. 1, 333, 212, 188, 187, 309, 304, 192, 312, 314, 315, 325, 327

[56] References Cited

UNITED STATES PATENTS

| 3,379,408 | 2/1965 | Lowrey | 251/312 X |
|---|---|---|---|
| 1,065,913 | 7/1913 | Bice | 137/614.17 X |
| 2,341,411 | 2/1944 | Ojalvo | 137/614.17 |
| 2,659,568 | 11/1953 | Grove et al. | 251/DIG. 1 |
| 2,720,219 | 10/1955 | Grove et al. | 251/210 X |
| 3,363,650 | 1/1968 | Scaramucci | 137/614.17 |
| 3,365,168 | 1/1968 | Latham et al. | 251/192 X |
| 3,426,795 | 2/1969 | Muller | 137/614.17 |

Primary Examiner—Douglas Hart
Assistant Examiner—Richard Rothman
Attorney—E. Hastings Ackley

[57] ABSTRACT

Valves of the sliding gate and rotary plug types having a body with inlet and outlet ports, an apertured closure assembly controlling flow therethrough including a primary closure member and a secondary closure member, and a soft seal means surrounding at least one of said ports and sealing between the body and the closure assembly, said secondary closure member co-acting with said primary closure to close said aperture means of said closure assembly prior to movement of said aperture means past said seal means to maintain effectiveness of said seal means between the body and closure assembly. Single and multiple port sliding gate valves and cylindrical, tapered, and ball type plug valves provided with such closure assemblies are disclosed.

68 Claims, 31 Drawing Figures

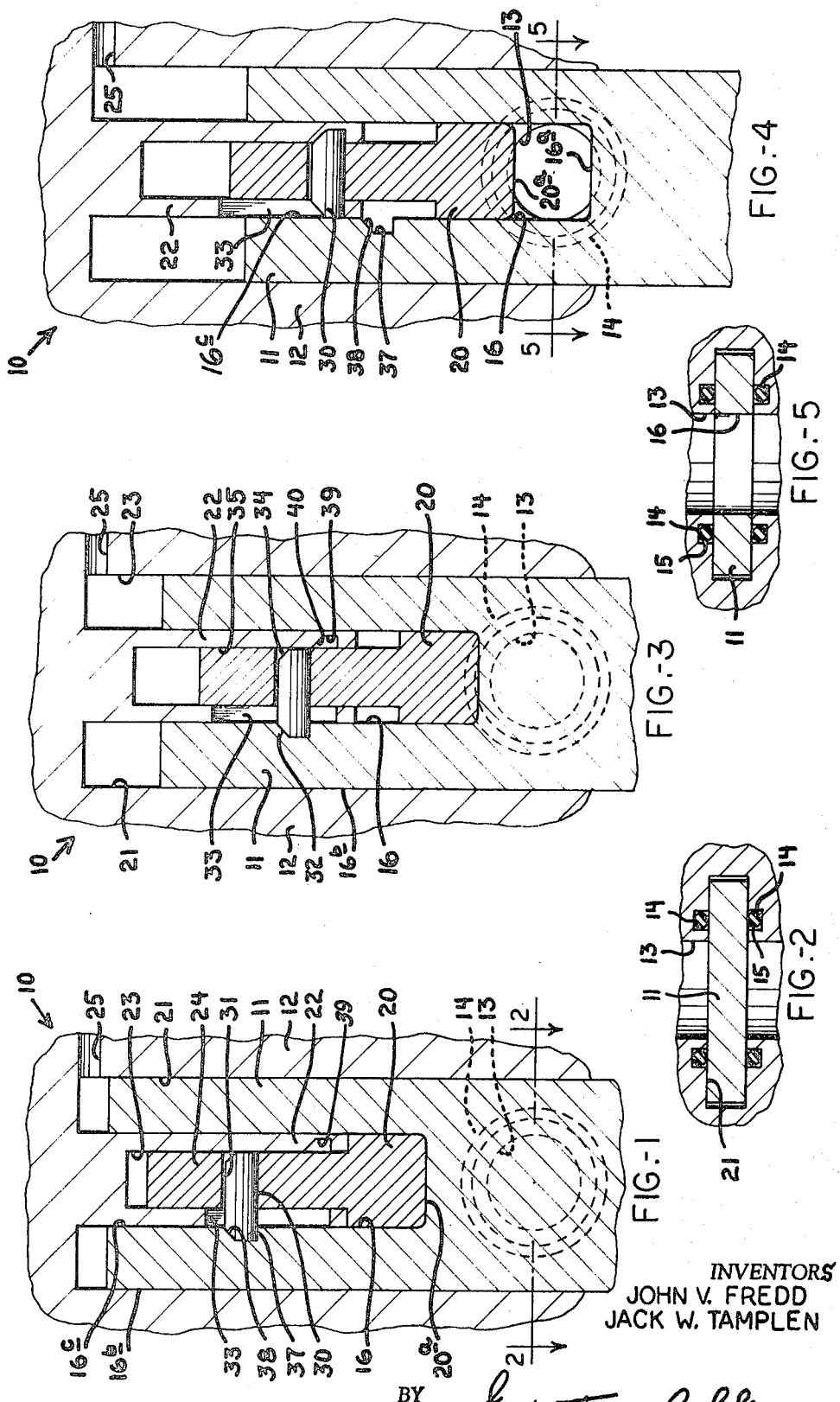

INVENTORS
JOHN V. FREDD
JACK W. TAMPLEN

BY *Hastings Ackley*

ATTORNEY

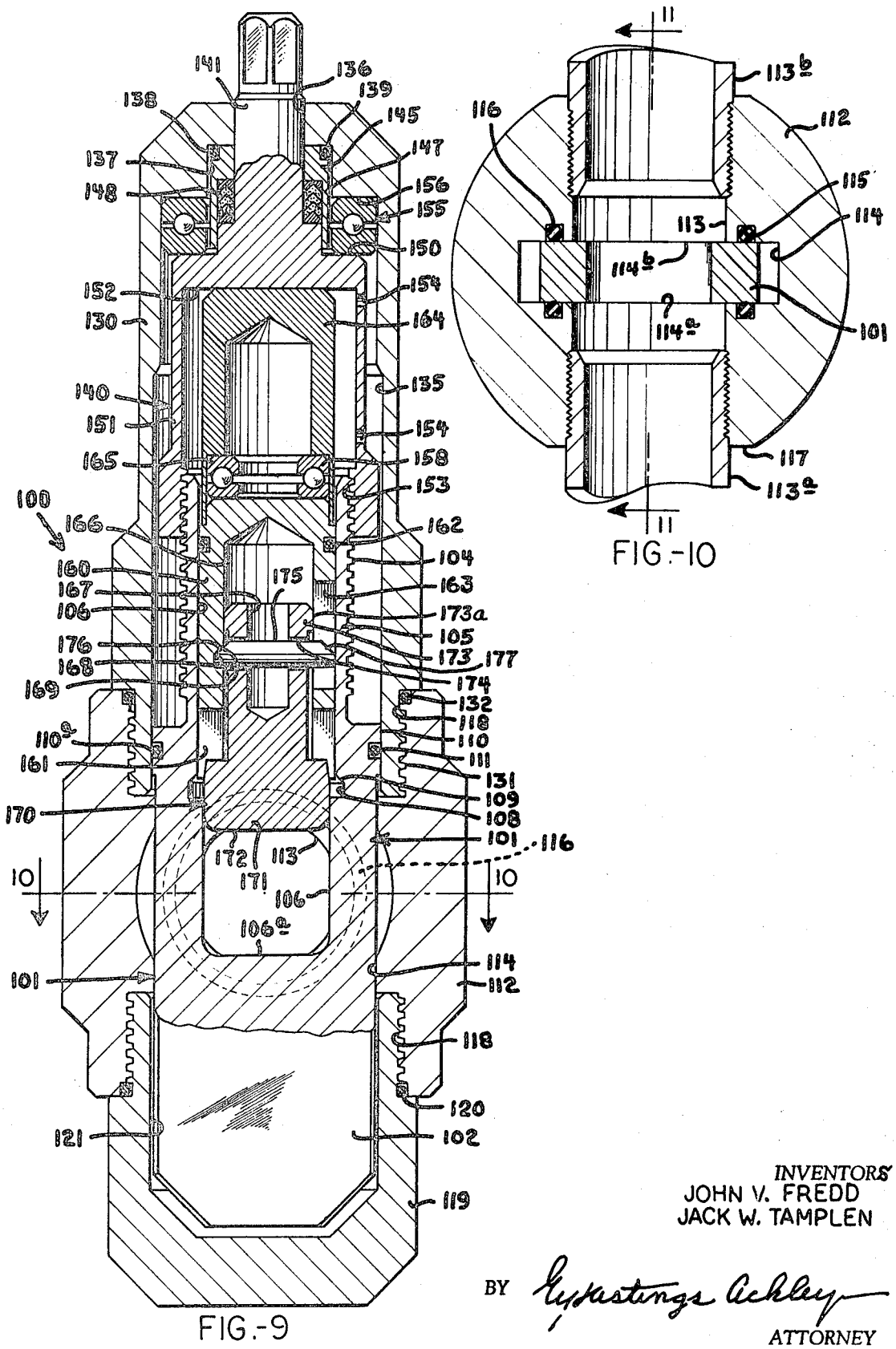

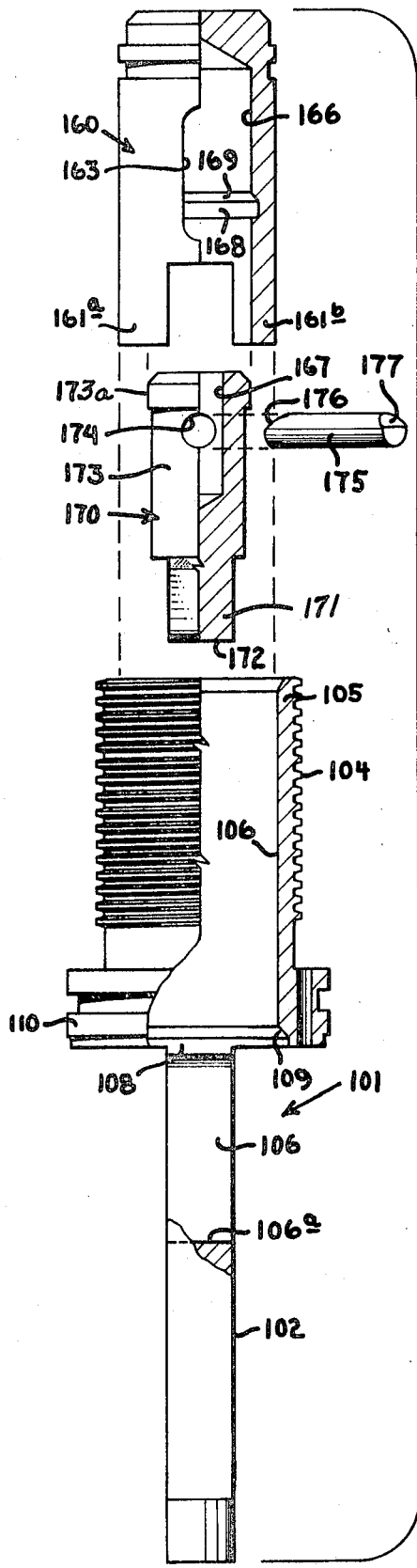
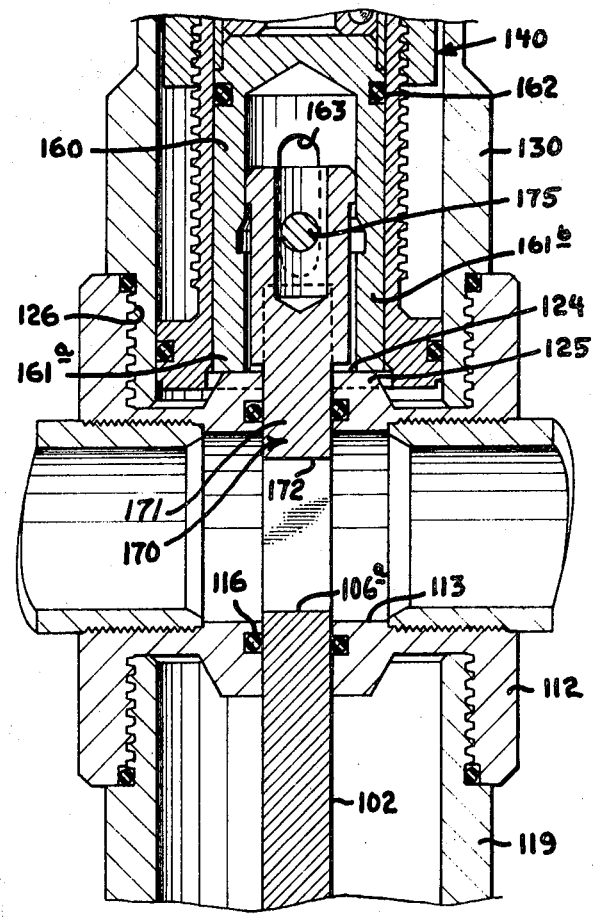
FIG.-11
FIG.-12

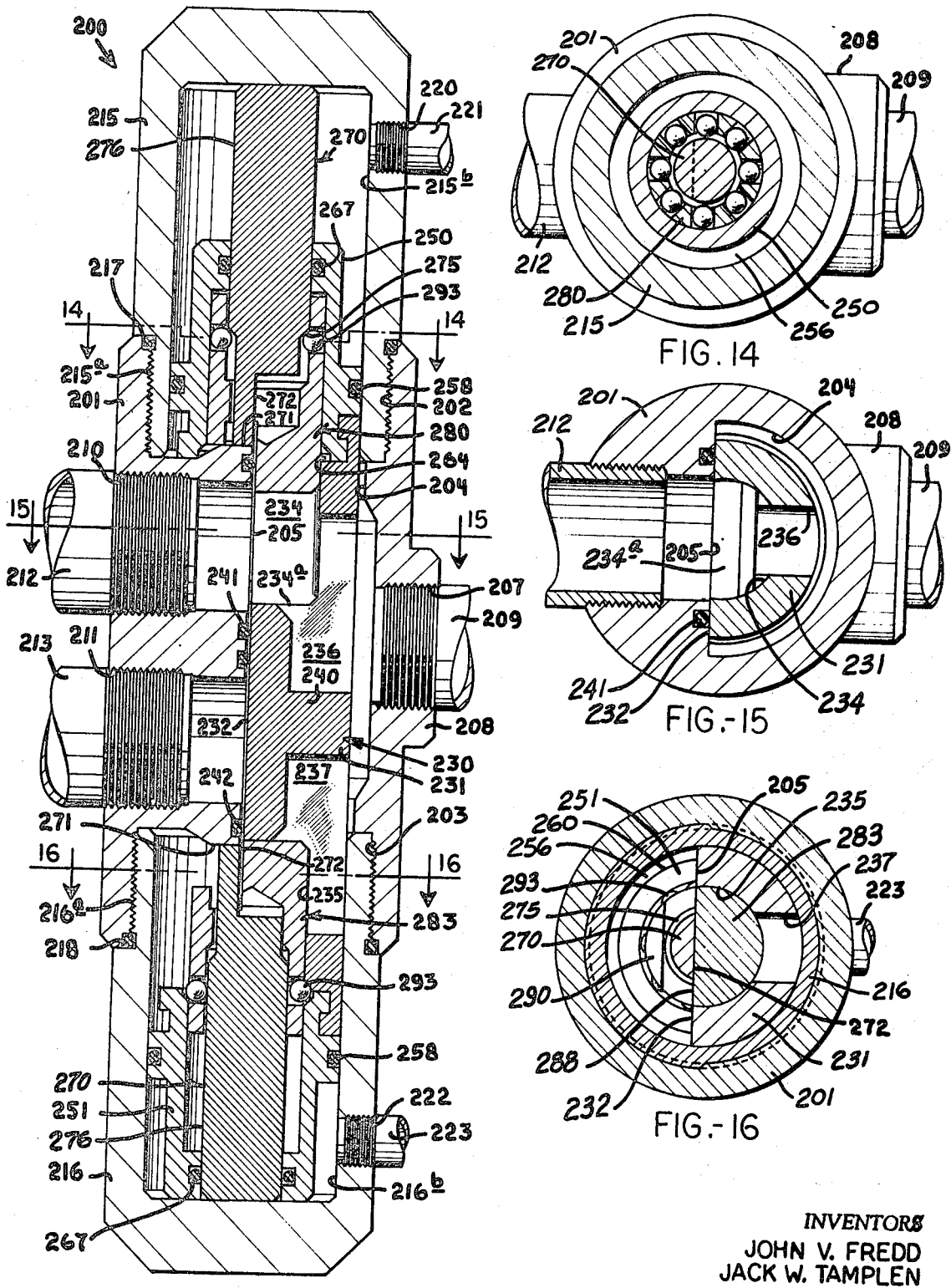

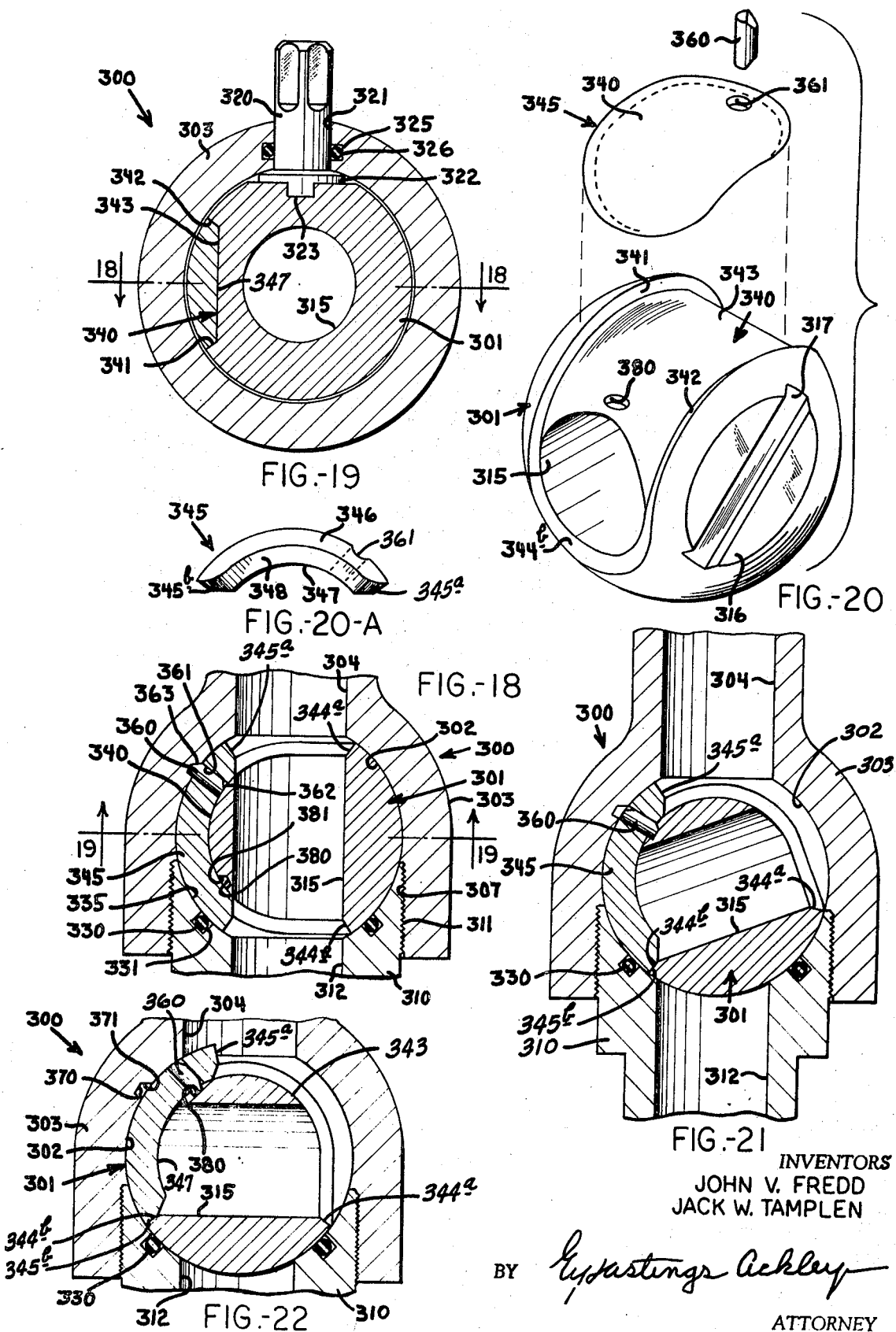

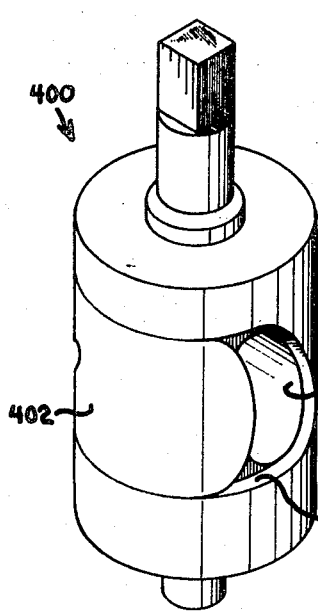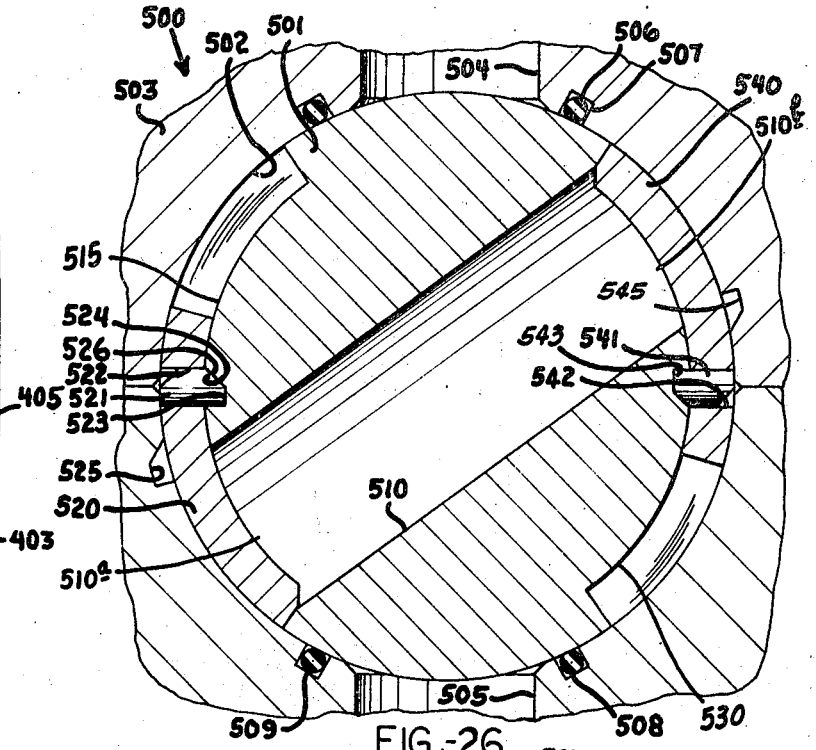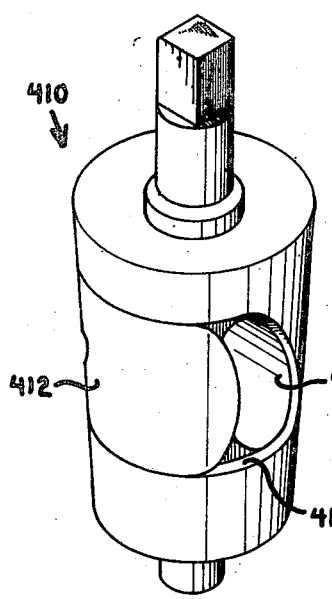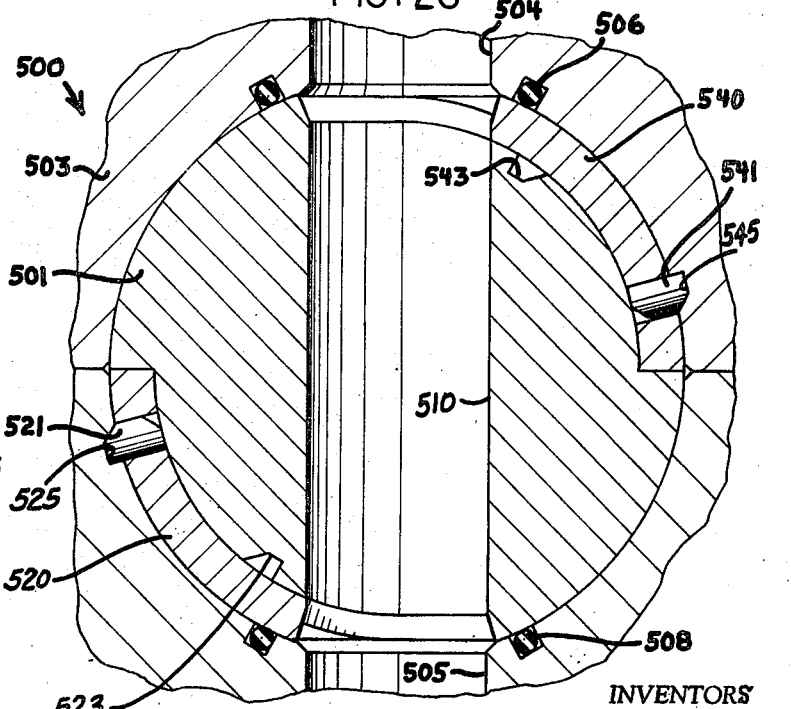

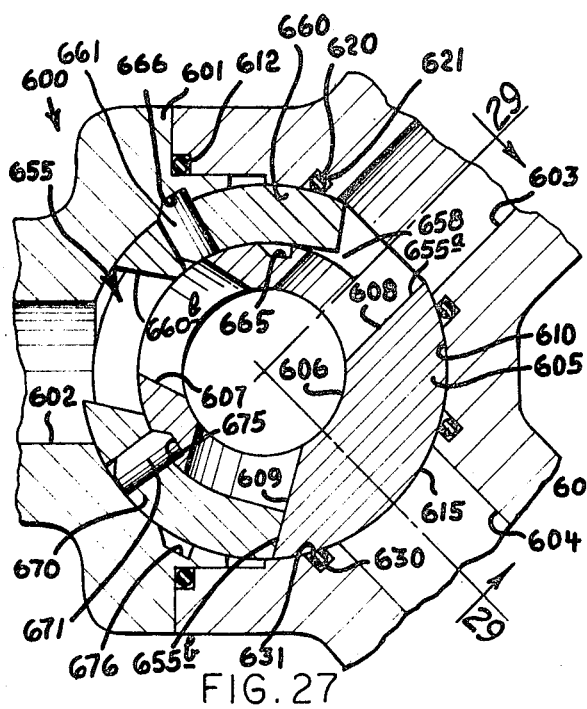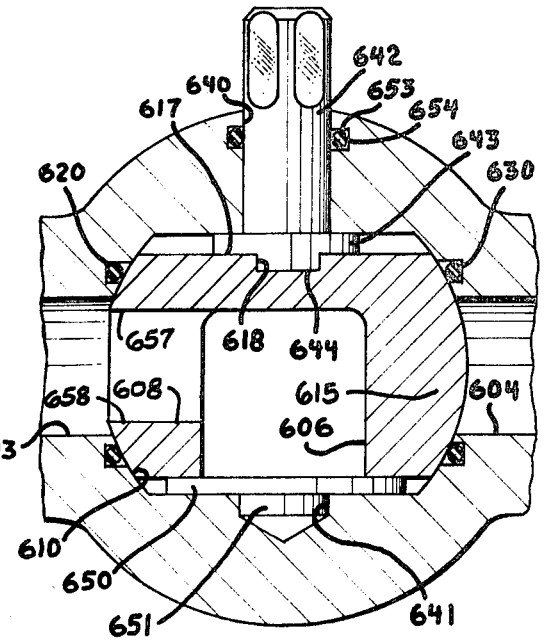
FIG. 27
FIG. 29
FIG. 28
FIG. 30
INVENTORS
JOHN V. FREDD
JACK W. TAMPLEN

VALVES

One object of the invention is to provide an improved valve and closure assembly.

An important object of the invention is to provide an improved valve having a soft seal between the valve body and a closure assembly, wherein said closure assembly is constructed to be operated between opened and closed positions with minimum damage to the soft seal.

Still another object of the invention is to provide, in a valve, means for preventing serious damage to or destruction of a soft seal between the body and closure under high pressure operating conditions when the closure is moved between opened and closed positions.

Still a further object of the invention is to provide soft seal means for sealing between a body and a closure assembly in a valve of the gate or plug type permitting movement of the closure assembly between opened and closed positions under high pressure with minimum damage to the soft seal, and wherein the closure assembly of the valve may be formed of cylindrical, tapered, or spherical plugs, and may be provided with seals on opposite ends of the flow passage through the plug.

It is a particularly important object of the invention to provide an improved valve having a body with inlet and outlet ports communicating with each other, a closure assembly movable in said body between open and closed positions to control flow between the inlet and outlet ports of the body, seal means in the body surrounding at least one of the inlet and outlet ports and sealing between the body and the closure assembly, and secondary closure means in said closure assembly coacting with the primary closure member in said assembly to prevent extrusion of the seal means during movement of the closure assembly between open and closed positions.

Another object of this invention is to provide, in a valve having a body with a flow passage therethrough and an apertured closure member coacting with the flow passage to control flow through the valve, a soft seal between the closure member and the valve body, and means for preventing extrusion of the soft seal when the aperture of the closure member moves past it.

A further object of the invention is to provide a valve of the character described having a plurality of inlet or outlet ports and a valve closure assembly having aperture means therein for controlling flow between said inlet and outlet ports wherein the closure assembly includes means for closing the apertures through the closure assembly prior to movement of said apertures across the seal means between the body and the closure assembly; and, further, to provide such a valve in which the flow between the inlet and outlet ports may be proportioned by adjustment of the position of the closure assembly in the body.

Still another object of the invention is to provide a valve of the character set forth wherein the valve closure assembly is operable by fluid pressure means.

Still another important object of the invention is to provide, in a valve of the character described, means for automatically closing the aperture through the valve closure assembly as the valve closure assembly is moved between open and closed positions in either direction to assure that the aperture is closed before the same is moved across the seal means between the closure assembly and the valve body.

Still another object of the invention is to provide a slide valve having at least one inlet or outlet port and at least two outlet or inlet ports, respectively, and the closure assembly for controlling flow through the valve body is provided with means for closing the aperture through said closure assembly prior to movement of the closure assembly between open and closed positions in the body; and, wherein the valve closure assembly may be disposed at intermediate positions to proportion flow of fluids through the body; and, further, wherein said slide valve is provided with means for fluid pressure actuation of the closure of the closure assembly; and, wherein the high pressure fluid may be directed from a single upstream opening to a plurality of outlet openings past the closure assembly, so that the fluid is selectively directed to a plurality of outlets controlled by the closure assembly.

A further important object of the invention is to provide an improved valve having a body with inlet and outlet ports therein, a primary closure member having a flow passage therethrough and movable in the body to control fluid flow between the inlet and outlet ports, seal means in the body surrounding the inlet and outlet ports and sealing between the body and the primary closure member, and secondary closure means coacting with the primary closure member to prevent extrusion of the seal means by fluid pressure during movement of the flow passage of the primary closure member past the seal means.

Additional objects and advantages of the invention will be readily apparent from the reading of the following description of a device constructed in accordance with the invention, and reference to the accompanying drawings thereof, wherein:

FIGS. 1 through 5 are fragmentary views showing the structure and operation of a valve and closure means constructed in accordance with the invention; FIG. 1 showing the valve with its closure means in closed position; FIG. 2 showing a cross-section taken along line 2—2 of FIG. 1; FIG. 3 showing the valve with its closure means in partly open position; FIG. 4 showing the valve open; and FIG. 5 showing a cross-section taken along line 5—5 of FIG. 4;

FIGS. 6 through 8 are views, partly in elevation and partly in section, of a gate type valve constructed in accordance with the invention; FIG. 6 being a longitudinal sectional view showing the valve open; FIG. 7 being a cross-sectional view taken along line 7—7 of FIG. 6; and FIG. 8 being a longitudinal sectional view taken along line 8—8 of FIG. 7;

FIG. 9 is a longitudinal sectional view, with some parts in elevation, showing a further embodiment of a gate type valve constructed in accordance with the invention;

FIG. 10 is a cross-sectional view taken along line 10—10 of FIG. 9;

FIG. 11 is a fragmentary longitudinal sectional view taken along the line 11—11 of FIG. 10;

FIG. 12 is a longitudinal exploded view, partly in elevation and partly in section, showing the closure means of the valve of FIG. 9;

Figure 6:
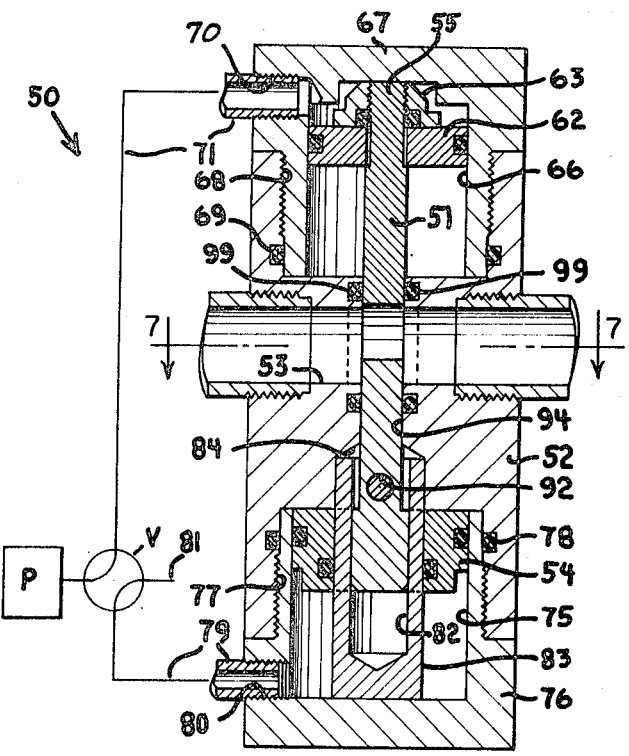

FIGS. 13 through 17 are views showing a slide of the three-way type valve constructed in accordance with the invention: FIG. 13 being a longitudinal sectional view showing the valve with its closure means in position closing one outlet and opening the other outlet; FIG. 14 being a cross-sectional view taken along line 14—14 of FIG. 13; FIG. 15 being a cross-sectional view taken along line 15—15 of FIG. 13; FIG. 16 being a cross-sectional view taken along line 16—16 of FIG. 13; and FIG. 17 being an exploded perspective view, partly in elevation and partly in section, showing the valve closure assembly of the valve of FIG. 13;

FIGS. 18 through 22 are schematic views showing the structure and operation of a valve constructed in accordance with the invention having a spherical plug-type closure member; FIG. 18 being a longitudinal sectional view showing the valve in open position, FIG. 19 being a cross-sectional view taken along line 19—19 of FIG. 18, FIG. 20 being an exploded perspective view showing the spherical closure assembly of the valve of FIG. 18, FIG. 20A being a side elevational view of the secondary closure member, FIG. 21 being a sectional view, similar to FIG. 18, showing the valve of FIG. 18 in a partly closed position; and FIG. 22 being a sectional view, similar to FIG. 21, showing the valve closed;

FIG. 23 is a perspective view of a valve closure assembly for a cylindrical plug type valve constructed in accordance with this invention;

FIG. 24 is a perspective view, similar to FIG. 23, showing a valve closure assembly for a tapered plug type valve constructed in accordance with the invention;

FIGS. 25 and 26 are cross-sectional views of a valve having a rotary plug type primary closure member provided with secondary closure members at each end of the flow passage therethrough, FIG. 25 showing the valve open and FIG. 26 showing the valve closed;

FIGS. 27 and 28 are transverse sectional views of a further modified form of plug valve having an inlet port and a plurality of outlet ports and showing the plug closure means in positions selectively communicating with the outlet ports;

FIG. 29 is a sectional view taken on line 29—29 of FIG. 27; and,

FIG. 30 is a fragmentary sectional view through the valve showing the body and operating stem seal arrangement.

In the drawings, FIGS. 1 through 5 illustrate schematically a sliding gate type valve 10 having a primary closure member or gate member 11 slidable in the body 12 across the flow passage 13 therein for opening and closing said flow passage. An O-ring or seal member 14 is disposed in an annular groove 15 on each side of the primary closure member and in engagement with said closure member, as best shown in FIGS. 2 and 5, and as shown in dotted lines in FIGS. 1, 3 and 4. When the primary closure member 11 is moved between the closed position shown in FIG. 1 and the open position shown in FIG. 4, an elongate longitudinally extending bifurcation or transverse opening 16 provided in said primary closure member or gate member is moved from a position out of flow communication with the flow passage 13 in the body to a position communicating with and opening the flow passage to flow therethrough. During movement of said gate member between open and closed positions, the edges of the opening 16 move across the engaging surfaces of the O-rings or seal members 14. Fluid pressure within the flow passage 13 acting across the seal members will tend to displace the O-rings from the grooves 15 in which they are disposed and to extrude such O-rings or seal members into the space between the gate or closure member 11 and the valve body 12, and so to damage or destroy the seal members and thus reduce or eliminate the effectiveness of the seal means. While two O-rings or seal members 14 are shown, it is obvious that a single ring may be used, if desired.

To prevent such extrusion or damage or destruction of the O-rings, with resulting loss of seal effectiveness, a secondary closure member or tongue member 20 is slidably mounted and movable in the elongate opening 16 in the primary closure member or gate 11 to a position wherein the inner end 20a of said tongue or secondary closure member is in abutting engagement with the inner end 16a of said opening in said gate, thus closing the inner portion of said opening before said primary closure or gate member is moved between open and closed positions, so that no displacement of the O-rings 14 occurs as a result of the differential pressure thereacross during movement of the abutting portions of the tongue 20 and primary closure or gate member past the seal member in either direction, as from the closed position of FIG. 1 to the open position of FIG. 4 and vice versa.

The primary closure member 11 may be moved in the housing 12 in any suitable manner, as by means of a handle (not shown) connected to the end of said primary closure member opposite the end in which the opening 16 is formed. The primary closure member 11 is slidable in a body opening or bore 21 formed in the body 12, and the body is formed with a guide member or portion 22 which slidably engages in the opening 16 in the primary closure member and which has an axial longitudinal guide opening 23 formed therein for receiving the shank or tang portion 24 of the secondary closure member 20. The length of the guide member 21 is such that the primary closure member 11 may move to the completely closed position shown in FIG. 1 with the secondary closure member 20 abutting the inner end 16a of the opening 16. An equalizing port 25 is formed in the body communicating with the bore 21 outwardly of the primary closure member 11 to assure that the closure member may slide freely in such body opening.

For causing automatic simultaneous movement of the secondary closure member 20 with the primary closure member 11 between the positions shown in FIG. 1 and the positions shown in FIG. 4, a latch pin 30 is disposed in a transverse aperture 31 in the shank or tang of the secondary closure member and is slidable longitudinally of such opening and transversely of the tang of the secondary closure member between the position shown in FIG. 1 and the position shown in FIG. 4. An elongate longitudinal slot 33 is formed in the guide member 22 and the projecting left hand end of the pin 30 is slidable in such longitudinal slot during movement of the primary closure member 11 and the secondary closure member 20. The opposite side of the axial opening in the guide member is imperforate and forms a camming lock or stop surface 35 engageable with the opposite or right hand end of the latch pin for holding the left hand end of the latch pin in the projecting position shown in FIG. 1 wherein the projecting portion of the pin is engaged in a lock recess or notch 37 formed in one leg 16b of the bifurcation of the primary closure member in the longitudinal wall of the bifurcation or opening 16 forming such leg. The notch is provided with a beveled wall 38 at its outer end and a complementary bevel 32 is provided on the projecting end of the pin, and engagement of the beveled end of the pin with the beveled surface in the notch holds the pin against rotation about its longitudinal axis in the opening in the tang of the secondary closure member. As is clearly seen in FIGS. 1 and 2, the opposite right hand end of the locking pin rides on the camming lock surface 35 of the longitudinal axial guide opening 23 in the guide member 22 and the projecting or left hand end of said pin is held engaged in the notch 37 in the leg 16b of the closure member 11 so that, as the primary closure member 11 is moved by the operating handle (not shown), the engagement of the projecting end of the pin in the notch causes the secondary closure member or tongue to move with the primary closure member with the lower end 20a of the secondary closure member in engagement with the inner end 16a of the opening in the primary closure member, as shown in FIG. 3.

When the secondary closure member 20 has been moved to the position shown in FIG. 4, the locking pin 30 engages the inner end of the elongate slot 33 in the guide member, and further movement of the tongue or secondary closure member is prevented. The camming action caused by the beveled surface 38 of the notch 37 formed in the leg 16b of the primary closure member cams the locking pin longitudinally out of the notch 37 to move the opposite end of the pin into engagement in locking recess or notch 39 formed in the opposite wall of the opening 23 in the guide member 22. The camming effect of the beveled surface 38 and the bevel 32 on the pin thus moves the pin out of the notch or lock recess 37 and permits the primary closure member 11 to move on to the fully opened position shown in FIG. 4 while the camming stop or lock surface on the inner side 16c of the left hand leg 16b of the primary closure member holds the pin with its opposite or right hand end engaged in the notch 39. In this position the valve is open and flow may take place through the flow passage 13 of the body.

When the valve is moved from the open position shown in FIG. 4 toward the closed position shown in FIG. 1, the primary closure member 11 is moved outwardly from the position in FIG. 4 until the notch or lock recess 37 is disposed adjacent and in alignment with the left hand or projecting end of the locking pin 30. At this point the inner end 16a of the opening in the primary closure member engages the inner end 20a of the tongue or secondary closure member 20 to close the aperture or opening 16 through the primary closure member. Such closing is effected prior to the movement of the abutting surfaces or juncture line of the tongue or secondary closure member and the gate or primary closure member past the engaging surfaces of the O-ring seal members 14. As will be seen in FIG. 3, such closure is effected before any slight gap through the closure assembly at the line of juncture between the primary closure member 11 and the secondary closure member 20 is moved across the engaging surfaces of the seal rings or O-rings 14, so that there can be no extrusion of the seal rings by fluid pressure differential acting across said seal rings.

As the primary closure member then moves further outwardly with the notch or recess 37 disposed in alignment with the left hand or projecting end of the lock pin 30, such further longitudinal movement of the primary closure member causes outward movement of the secondary closure member and the pin 30 in the aperture 31 therein, so that the camming force of the beveled end 34 at the right hand or opposite end of the locking pin with the beveled camming surface 40 of the lock recess 39 cams the locking pin longitudinally out of the lock recess 39 and the left hand projecting end of the pin into engagement in the lock recess 37 in the leg 16b of the bifurcation of the primary closure member. The right hand end of the locking pin will then ride along the camming lock surface 35 of the guide opening 23 in which the tang of the secondary closure member is slidable until the valve closure member assembly or means reaches the fully closed position shown in FIG. 1 and only the imperforate portion of the primary closure member 11 is disposed in sealing engagement with the O-rings 14.

The abutting edges 16a of the primary closure member 11 and 20a of the secondary closure member are thus moved past the O-rings in either direction from closed to open position and from open to closed position while in such abutting engagement, so that no extrusion of the 0-rings can take place during such movement and damage to or deterioration of the effectiveness of the seal provided by the 0-rings is prevented.

It is thus apparent that the O-rings or soft seal members 14 are confined to or retained within the grooves or recesses in which they are mounted by the engagement of the valve closure means with said seal means at all positions of the primary closure member and secondary closure member comprising the valve closure means or assembly between open and closed positions. This arrangement of the valve closure assembly and seal means prevents deterioration or destruction of the effectiveness of the seal means which might otherwise result from extrusion or flow of such seal means out of the recesses or grooves in which they are confined or retained by fluid pressure differentials acting across said seal means. Thus, a valve has been provided in which the seal means will effect and maintain an effective seal between the valve body and the movable closure means or assembly at low pressure differentials and yet will maintain such effective seal under high pressure differentials, without deterioration or destruction of such seal, even during movements of the valve closure means or assembly between open and closed positions.

Also, it is readily apparent that only a single O-ring or seal ring will effectively seal between the body or housing 12 and the primary closure member 11 when the valve closure means or assembly is in closed position, so that no flow of fluids under pressure can take place through the passage 13 in the housing.

Figure 7:
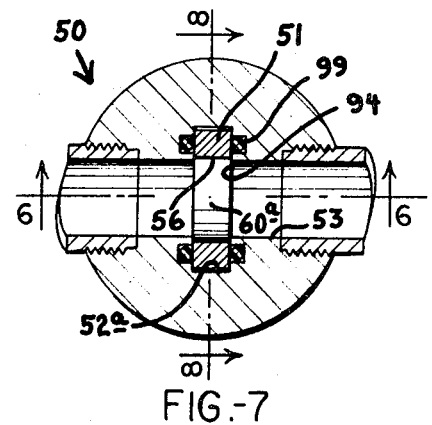
Figure 8:
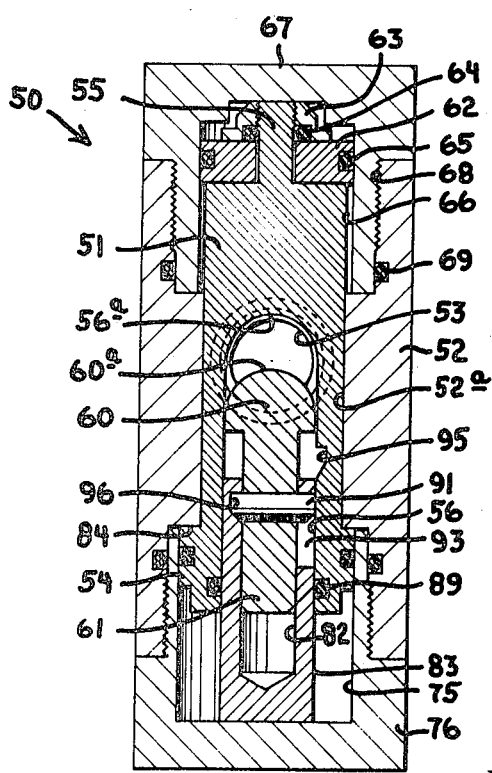
Figure 17:
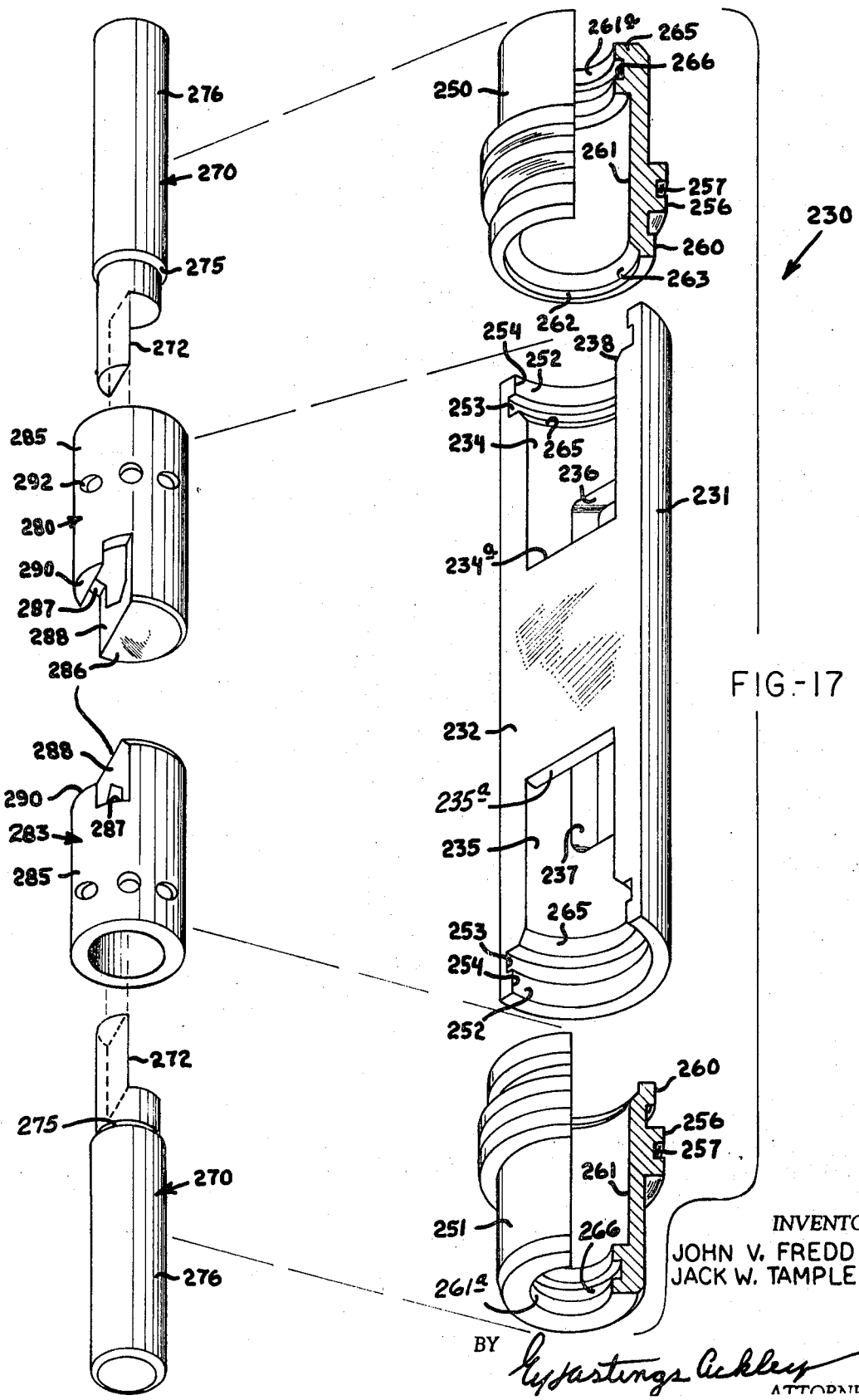

A slightly modified form of gate valve 50 is shown in FIGS. 6 through 8 wherein the primary closure member 51 is slidable in an opening 94 in a body or housing 52 shown as substantially cylindrical in external configuration and having a flow passage 53 extending transversely thereof intermediate its ends. The slidable closure gate member 51 has a piston 54 formed integral at one end and an elongate longitudinal transverse opening 56 is formed in the closure member extending longitudinally from the end beyond the piston 54 to substantially the mid-portion of said member where the inner end 56a of such opening is substantially semi-circular. The secondary closure or tongue member 60 is slidable in the longitudinal opening 56 in the closure or gate member 51 in the same manner as that of the form first described, and has a generally semi-circular inner end portion 56a of the opening 56 in the primary closure member. The opposite end of the primary closure member is provided with a projecting shank 55 on which is mounted a piston 62 held in place on the shank by a lock nut 63. An O-ring 64 in a counter-bore of the lock nut seals between the nut and the shank and between the nut and the piston, and an O-ring or seal member 65 on the external cylindrical surface of the piston seals between the piston and the bore wall of a cylinder or pressure chamber 66 formed in the closure cap 67 at such end of the housing 52. The cap is threaded into a cylindrical enlargement 68 in the bore of the housing and an O-ring or other seal member 69 is disposed in an internal annular groove in such enlarged bore for sealing between the cap and the housing or body to prevent fluid leakage therebetween. A lateral opening 70 is provided in the side wall of the cap at its outer end communicating with the cylindrical bore 66 and a flow conduit 71 is threaded thereinto for conducting fluid pressure into the cylinder to act on the piston 62 to move the primary closure member 51 toward closed position. The end of the primary closure member having the integral piston 54 formed thereon is slidable in a cylindrical bore or pressure chamber 75 formed on a cap 76 threaded into a cylindrical counterbore 77 in that end of the body 52. An O-ring 78 or other suitable seal member is provided in a suitable internal groove in the counterbore for sealing between the cap and the body to prevent fluid leakage therebetween. A fluid port 80 is formed in the side wall at the outer end of the cap 76 and a fluid pressure conduit 79 is threaded into such port to conduct fluid pressure into said cylinder or chamber to move the piston therein and thus move the primary closure member toward open position.

The stem or tang 61 on the secondary closure member 60 is slidable in a cylindrical bore 82 in a cylindrical guide member 83 which is confined between the closed outer end of the cap 76 and an internal outwardly facing shoulder 84 formed in a counterbore in the body surrounding the portion of the primary closure member adjacent the integral piston 54, so that the guide member is held against longitudinal movement in the body between such shoulder and the cap or closure. The inner end portion of the external cylindrical portion of the guide member 83 is slidable in the elongate opening 56 in the primary closure member 51 in the same manner as the guide member 22 of the form first described. A seal ring or O-ring 89 is disposed in a suitable internal annular groove formed in the piston 54 on the primary closure member and seals between the piston and the guide member, whereby fluid pressure entering into the cylinder 75 through the port 80 will act on the piston to move the closure member toward the position shown in FIGS. 6 and 8. The latch pin 91 is slidable in a transverse opening 92 in the stem or tang 61 of the tongue or secondary closure member in the same manner as the pin 30 of the form first described, and the right hand or projecting end of such pin, as seen in FIG. 8, is slidable in the elongate longitudinal slot 93 formed in the guide member. Rotation of the secondary closure member and the primary closure or gate member with respect to each other, cannot take place since these members have flattended portions disposed in the rectangular body opening 94 in the body, as is clearly shown in FIGS. 6 and 7, and the projecting or right end of the pin 91 is slidable in the longitudinal slot 93 in the wall of the guide member 83 and holds the guide member against rotation. Thus, the pin 91 may engage in the notch or locking recess 95 in the wall of the opening 56 in the primary closure member when the secondary closure member is in the closed position. The opposite or left hand end of the pin 91 is engageable in a locking recess or notch 96 in the bore wall of the guide member corresponding to the notch 39 of the form first described.

The operation of the valve closure means or assembly comprising the primary closure member and secondary closure member, in this form of the valve, is substantially identical to that of the form first described, since the semi-circular inner end 60a of the secondary closure member is moved into abutting engagement with the semi-circular inner end surface 56a of the opening in the primary closure member or gate 51 before movement of such abutting surfaces past the engaging surfaces of the O-rings 99 disposed in suitable grooves in the body surrounding the flow passage 53 on opposite sides of the closure means and sealing between the closure means and the body.

The valve is operated by means of fluid pressure supplied from a source P to a three way valve V connected with the conduits 71 and 79, whereby fluid pressure may be introduced from the pressure source through the conduit 79 into the cylinder 75 to act on the piston 54 to move the primary closure member toward the open position shown in FIGS. 6 and 8, or the fluid pressure may be exhausted from such cylinder 75 through the conduit 80 and the four way valve V to the atmosphere through the exhaust pipe 81, and pressure from the source P supplied through the conduit 71 to the cylinder 66 to act on the piston 62 to move the primary closure member from the position shown in FIGS. 6 and 8 toward the closed position (not shown), wherein the imperforate portion of the primary closure member is disposed across the flow passage 53 in the body and sealed off by the O-rings 99 in the same manner as in FIG. 1 of the form first described.

In this form, the valve is operated by fluid pressure and has a slightly different shape of the opening in the primary closure member and of the secondary closure member and the guide means is cylindrical, but the functioning of these parts is substantially identical to that of the form of the valve previously described, and all advantages of the first form are present in this modified form.

A modified form of valve 100 having a closure assembly similar to the form of that schematically illustrated in FIGS. 1 through 5 is shown in FIGS. 9 through 12. The valve of this modified form includes a primary closure member 101 in the form of an elongate gate member slidable in a substantially rectangular opening 114 in a body 112 which is substantially cylindrical in form and has a transverse flow passage 113 formed therein traversing the body opening and having internal threads by means of which flow conduits or pipes 113a and 113b may be connected to the body for conducting fluids thereto. The substantially rectangular opening 114 formed in the body receives the substantially rectangular primary closure member or slidable gate 101, as clearly shown in FIGS. 10 and 11. The transverse opening is somewhat enlarged in its central portion by virtue of having been formed by turning with a fly cutter or the like to provide the opposed planar surfaces 114a and 114b of the rectangular opening through which the closure member slides. Annular recesses or grooves 115 are formed in these opposed planar surfaces of the body and receive seal members or O-rings 116 for sealing between the body and the valve closure assembly or means, comprising the primary closure member 101 and secondary closure member 170, as clearly shown in FIGS. 10 and 11.

The body 112 is substantially cylindrical in configuration and has flats 117 formed on its exterior surrounding the outer ends of the flow openings 113 formed therein. The opposite ends of the body are reduced in diameter, as shown in FIG. 9, and are counterbored and provided with internal screw threads 118. A closure cap 119 is threaded into one opening of the body and an O-ring 120 is disposed in a counterbore in the threaded opening between the cap and the body to seal therebetween. The cap has a cylindrical closed bore 121 into which the imperforate inner closure portion 102 of the primary closure member 101 is slidable when the closure member is moved to the open position as shown in FIG. 9. An elongate cylindrical bonnet 130 having external screw threads 131 at one end is threaded into the counterbore 118 at the other end of the valve body and an O-ring 132 is disposed in a recess in such counterbore surrounding the threaded end portion of the bonnet to seal between the bonnet and the body to prevent leakage therebetween.

The bonnet has an elongate cylindrical bore 135 for receiving the inner end of a valve closure assembly operator member 140 which has a reduced stem portion 141 at its upper end extending outwardly through an axial opening 136 in the outer end of the bonnet. A seal bushing 145 surrounds the reduced stem of the operator member and has its upper portion disposed in a reduced counterbore 137 formed in the upper end of the bore of the bonnet. An O-ring 138 disposed in an internal annular recess 139 in the upper portion of the bushing seals between the bushing and the bonnet. The bushing is provided with an enlarged skirt 147 which receives a sealing assembly of V-packing 148 or the like therein for sealing between the bushing and the reduced stem portion 141 of the operator member to prevent leakage of fluid pressure therepast from within the bonnet and valve body. An external annular upwardly facing shoulder 150 is formed on the operator member 140 between the reduced stem portion and the depending operating sleeve or skirt portion 151, and the lower portion of the sleeve portion is enlarged in external diameter to provide sufficient strength for the internal operating threads 153 formed in the lower portion of the bore of said skirt or sleeve 151. The operating threads 153 mate with external operating threads 104 formed on a cylindrical tubular extension 105 on the outer end of the primary closure member or gate 101, so that rotation of the stem and operator member 140 actuates the threads of the sleeve and the gate extension 105 to move the gate or primary closure member longitudinally of the body between open and closed positions. An anti-friction bearing 155 is provided in the bore 135 of the bonnet between shoulder 150 on the operator member and an internal downwardly facing shoulder 156 in the outer end of the bore of the bonnet.

A cylindrical tubular guide member 160 having its lower end bifurcated to form legs 161a and 161b on opposite sides thereof is disposed in the tubular bore of the gate extension 105 and the lower bifurcated end portions 161a and 161b of the guide engage the outer face 124 of an annular boss 125 formed in the counterbored end opening 126 in the valve body. The guide member is held in such abutting engagement with said body boss 125 by means of a tubular cylindrical spacer member bushing 164 which abuts the closed outer end 152 of the operator sleeve or skirt 151. This closed outer end of the skirt therefore holds the spacer member in position for the inner end of its inwardly extending skirt to engage over the reduced outer end portion of the guide member 160 and an anti-friction bearing 158 is disposed in the enlarged bore of the skirt of the spacer member and engages the upper outer end of the guide member 160 and the shoulder 165 at the outer end of the enlarged bore of the spacer member skirt, whereby the spacer member and bearing press against the end of the guide member to firmly and securely hold the same in engagement with the surface of the boss in the body and against longitudinal movement in the bonnet, and said spacer member is free to rotate with respect to the guide member during rotation of the operator member 140, if need be.

The primary closure member 101 is formed with a longitudinally extending transverse opening 106 in the outer portion of the rectangular gate portion thereof and is movable from a position in which the transverse opening is out of communication with the flow passage 113 in the body to the position shown in FIGS. 9, 10 and 11, in which said transverse opening is in flow communication with the flow passage 113. The secondary closure member or tongue 170 has a substantially rectangular inner closure portion 171 and is slidable in said opening 106 in the primary closure member between an open position, as shown in FIG. 9, and a closed position in which the inner end 172 of said rectangular portion engages the inner end 106a of the opening 106 in the primary closure member to close the opening in the same manner as in the form illustrated in FIGS. 1 through 5. The outer portion 173 of the secondary closure member is shown to be substantially cylindrical in form, as clearly seen in FIG. 12, and is provided with a transverse opening or aperture 174 for receiving a latch pin 175 which is slidable in said transverse opening. The extreme outer end portion of said cylindrical section 173 of the secondary closure member is slightly enlarged to provide an annular flanged guide or bearing 173a which is slidable in the guide bore 166 of the tubular guide member 160, the intermediate reduced portion of the cylindrical portion 173 of the secondary closure member providing a relief to prevent accumulation of foreign matter between the secondary closure member and the guide member so that the same may move freely with respect to each other during operation of the valve. An upwardly opening counterbore 167 is formed in the secondary closure member to lighten its weight and to further provide for preventing accumulations of foreign matter in the transverse opening 174 in which the latch pin slides.

The latch pin 175 extends radially outwardly from the secondary closure member and its end projects into the elongate longitudinally disposed slot 163 formed in the tubular guide member 160 and slides against the inner cam locking wall 106 of the tubular extension 105 of the gate member to hold the opposite end of the pin engaged in a locking recess 168 formed in the bore wall 166 of the guide member 160. The recess 168 has a cam shoulder or surface 169 formed therein for coacting with a beveled camming surface 176 on the adjacent end of the latch pin.

The secondary valve closure member is therefore held against movement from the open position shown in FIG. 9 by the engagement of the end of the latch pin in the locking recess 168 until the primary closure member has moved outwardly with respect to the body a sufficient distance to align the locking recess 108 in the wall of the inner portion of the bore 106 of the tubular extension of said primary closure member with the adjacent projecting end of the lock pin 175. At this time, the inner end 106a of the opening 106 in the primary closure member is in abutting engagement with the inner end 172 of the secondary closure member to close the opening or aperture in such valve closure means or assembly for movement past the seal rings 116 in the manner described in connection with the valve schematically illustrated in FIGS. 1 through 5. The camming shoulder 169 of the locking recess 168 in the guide member engages the bevel 176 on the adjacent end of the lock pin to cam the pin longitudinally until the projecting end of the lock pin enters the locking recess 108 in the bore of the primary closure member to latch the secondary closure member to the primary closure member for simultaneous movement of the juncture line of their abutting portions past the seal means to dispose the inner imperforate closure portion 102 of the primary closure member in sealing engagement with the O-rings 116 to close the flow passage 113 through the valve body. The latch pin is held in engagement in the locking recess 108 by the engagement of its opposite end with the bore wall 166 of the guide member 160.

Fluid pressure is prevented from escaping outwardly between the tubular extension 105 of the primary closure member and the guide member 160 by means of an O-ring 162 disposed in an external annular recess formed in the outer end portion of the guide member inwardly of the end of the spacer bushing 164, and an external annular flange or piston 110 formed on the inner end portion of the tubular extension 105 of the primary closure member is provided with an external annular groove 110a in which an O-ring 111 is disposed to seal between the primary closure member and the bore 135 of the bonnet to prevent fluid leakage therepast.

Vent openings 154 may be provided in the wall of the operator skirt 151 to permit free movement of the tubular threaded extension of the primary closure member into the bore of the skirt as the operator member 140 is rotated to move the valve closure assembly between open and closed positions in the valve body.

The movement of the valve closure means or assembly comprising the primary closure member and secondary closure member from the closed position back to an open position is accomplished by opposite rotation of the operator member 140 to move the primary closure member and secondary closure member inwardly of the bonnet and body with respect to the guide member 160 until the latch pin 175 is positioned in alignment with the locking recess 168 in the bore of the guide member and the camming action of the camming surface 109 against the beveled cam surface 177 at the adjacent projecting end of the pin moves the latch pin longitudinally toward the recess 168 to engage the end of the pin in such recess 168 as shown in FIG. 9. The primary closure member 101 may then move further inwardly in the body with respect to the secondary closure member to the open position shown in FIG. 9.

The juncture line of the abutting inner end 172 of the secondary closure member and inner end 106a of the opening 106 in the primary closure member moves past the O-ring sealing member 116 prior to the movement of the latch pin into the locking recess 168 and the subsequent further movement of the primary closure member inwardly of the body with respect to the secondary closure member to the open position. This simultaneous movement of the primary closure member and secondary closure member with the inner end 172 of the closure member in engagement with the inner end 106a of the opening in the primary closure so that the juncture line of such members moves past the engaging surfaces of O-rings 116 prevents damage to the O-rings by any fluid pressure differential acting across the O-rings during such movement and so prevents displacement of the O-rings 116 from the annular grooves 115, and thus maintains the effectiveness of the seal rings in the manner already described.

All the advantages of the forms previously described are present in the form of the valve just described. The operating mechanism which has been disclosed differs from that previously described and there is a slightly different construction of the primary and secondary closure members and locking means, but otherwise the valve functions in the same manner as those already described.

A further modification of the sliding gate type valve structure of the invention is shown in FIGS. 13 through 17, inclusive, wherein the valve 200 has a substantially cylindrically shaped body 201 provided at its opposite ends with threaded counterbores 202 and 203, respectively, and having a substantially semi-cylindrical longitudinal medial bore 204 communicating with said counterbores, with the planar portion of said elongate semi-cylindrical bore disposed in substantial alignment with the axis of the counterbores at the opposite ends of the body. The medial bore, intermediate the counterbores, is formed with the planar seating or sealing surface 205 disposed substantially diametrically of the body. An inlet port or opening 207 is formed in a boss 208 intermediate the ends and medially of the semi-cylindrical medial bore 204 of the housing and is provided with threads for receiving an inlet conduit or pipe 209 whereby fluids may be conducted into the medial bore 204 of the body. A pair of longitudinally spaced outlet openings or ports 210 and 211 are provided in the diametrically opposed portion of the housing from the inlet and extend perpendicular to the planar seating or sealing surface 205 and are spaced longitudinally from each other. The outlet ports are provided with internal threads by means of which outlet conduit or pipes 212 and 213, respectively, may be connected thereto for receiving fluids from the medial bore of the housing through the outlet openings therein. The inlet opening 207, the semi-cylindrical medial bore 204 and the outlet openings 210 and 211 provide passages for the flow of fluids through the housing.

Closure caps 215 and 216 have reduced screw threaded ends 215a and 216a which are threaded into the threaded counterbores 202 and 203, respectively, of the housing for closing the ends of the bore of the housing. Sealing rings 217 and 218 are disposed in annular recesses formed in the outer portion of each of the counterbores of the housing and adjacent the shoulder formed on the closure member by the reduced threaded portion thereof to seal off fluid flow outwardly through the threaded portions. An operating fluid inlet port 220 is formed in the closure 215 near the outer closed end of the bore of said closure cap and a pressure fluid conduit or pipe 221 is threaded into said opening for conducting operating fluid under pressure into the bore of said closure cap for operating the valve in a manner which will be hereinafter described more fully. A similar operating fluid inlet port 222 is formed near the outer closed end of the closure cap 216 and communicates with the bore thereof, and a pressure fluid conduit or pipe 223 is threaded into said opening for conducting operating fluid pressure into the bore of the cap for acting on the valve in opposition to the pressure fluid in the cap 215 to control opening and closing of the valve as will be more fully described.

For controlling flow through the flow passages in the valve body, a valve closure assembly 230 is movably disposed in the medial bore of the body and in the opposed counterbores, and is confined between the closure caps 215 and 216. The closure assembly is illustrated in exploded isometric form in FIG. 17, and includes an elongate semi-cylindrical primary closure member 231 having a planar substantially diametrical seating and sealing surface 232 formed thereon intermediate its ends and movable with respect to the outlet openings in the valve body for closing the same. The planar portion of the closure member is cut away at each longitudinal end of said primary closure member to provide elongate substantially rectangular flow outlet openings 234 and 235 at each such end of said primary closure member, and a pair of longitudinally spaced rectangular inlet openings 236 and 237 are formed in the semi-cylindrical portion of the primary closure member, each communicating with one of the outlet openings to provide a pair of flow passages through said primary closure member. A semi-circular reinforcing rib 240 is thus formed in the semi-cylindrical portion of the primary closure member between the inlet openings 236 and 237, as is clearly shown in FIG. 13, and this rib strengthens the primary closure member and separates the flow passages.

An O-ring 241 is disposed in a suitable annular groove or recess surrounding the outlet opening 210, and a similar O-ring 242 is disposed in an annular groove or recess surrounding the outlet opening 211, and the central planar closure portion 232 of the primary closure member 231 cooperates with a selected one of the O-rings to close the corresponding outlet port according to the location of the primary closure member relative to the valve body. Thus, when the primary closure member is in the position shown in FIG. 13, the outlet port 211 is closed off against flow from the inlet port 207. When the primary closure member is moved longitudinally in the valve body to position the planar closure surface portion 232 thereof in alignment with the outlet opening 210, the O-ring 241 engages said planar closure surface and closes the outlet opening 210 against flow from the inlet opening 207 through such outlet opening 210. Since pressure acting on the primary closure member 231 biases the closure member toward the sealing rings or O-rings, it is obvious that the primary closure member need not have a close fit in the body of the valve, but may slide loosely therein so as to prevent binding or sticking.

For actuating the primary closure member, a tubular extension piston 250 is detachably connected to the adjacent end of the closure member nearest the outlet passage 210, and a similar oppositely directed piston extension 251 is detachably connected to the opposite end of said primary closure member. For connecting the pistons to the primary closure member, the opposite open bore ends of the primary closure member are provided with an enlarged bore 252 and an internal annular arcuate recess 253 providing an inwardly projecting arcuate flange 254 at each end. The inner end portion of each operating piston is provided with an external annular sealing piston flange 256 having an external annular groove 257 therein for receiving an O-ring sealing member 258 for sealing between said piston flange and the bore wall of the closure cap in which the piston is slidable. Inwardly of the piston flange, each operating piston is provided with an external annular operating flange 260 shaped to engage in the internal arcuate groove 253 in the adjacent end of the primary closure member by sliding laterally thereinto. Within the inner portion of the bore 261 of each of the operating pistons is an annular recess groove 262 providing a beveled shoulder 263 defining the outer limit of said groove. Such recess or groove formed in the bore of the piston coacts with the correspondingly beveled shoulder 265 formed in the bore of the primary closure member inwardly of the arcuate recess 253 in the bore of the closure member to provide an arcuate locking recess 264 between the beveled shoulders in the piston and in the bore of the primary closure member.

A guide and spacer member 270 is confined between the closed end of the closure cap and the outwardly facing shoulder 271 at the opposite ends of the planar seating and sealing surface section 205 of the medial bore of the housing, and the outer cylindrical portion 276 of such guide and spacer member is slidable in the reduced bore 261a at the outer end of the adjacent operating piston. An internal annular flange 265 is formed in the outer portion of the bore 261 of the operating piston by the reduced bore 261a and has an internal annular recess 266 therein for receiving an O-ring or sealing member 267 for sealing between the piston and the exterior cylindrical surface 276 of the guide and spacer 270. The inner end portion of the guide and spacer member 270 is cut away substantially diametrically to provide a planar guide surface 272 corresponding in position and substantially co-planar with the planar seating and sealing surface 205 in the body. A secondary closure member 280 is slidably disposed on the guide and spacer member 270 and within the bore 261 of the piston and in the elongate substantially rectangular outlet opening at each end of the primary closure member. One secondary closure member 280 is slidably disposed in the outlet opening 234 in said primary closure member 231 and another secondary closure member 283 is slidably disposed in the outlet opening 235 in said primary closure member coacting with the primary closure member to close the corresponding outlet openings to permit movement of the juncture line between the abutting portions of the secondary closure member and primary closure member past the engaging surfaces of the O-rings or sealing members 241 and 242, respectively, without damaging the same as a result of the pressure differential existing across the seal rings during such movement. Each secondary closure member is in the form of a substantially cylindrical tubular body portion 285 having a closed end 286. With the longitudinal rectangular cutaway portion 287 which provides a planar closure surface 288 disposed in longitudinal alignment with the planar closure surface 232 of the primary closure member and lying in the same plane as such closure surface, the outer arcuate cylindrical surface portion 285 of the secondary closure member spaced from the planar closure surface 288 is cut away longitudinally outwardly along the cylindrical body from the end closure 286, and the end of such upstanding portion 290 is adapted to engage the outwardly facing shoulder 271 at the adjacent end of the planar seating and sealing surface 205 of the body to limit movement of the secondary closure member inwardly in the bore of the body with respect to the outlet openings therein, so that the primary closure member may move longitudinally away form the adjacent secondary closure member to open the outlet opening for flow therethrough.

The cylindrical body portion of the secondary closure member is provided with a plurality of circumferentially spaced radially extending openings 292 in each of which a latching member or locking ball 293 is movably disposed for locking the secondary closure member to the primary closure member and for holding the secondary closure member against movement with respect to the guide and spacer member as will be hereinafter explained.

When the primary closure member is in a position in which the outlet opening therethrough is in open relationship to the outlet opening in the body, as the outlet opening 234 is shown in relation to the outlet opening 210 in the body in FIG. 13, the latching balls 293 are disposed to engage the beveled annular shoulder 275 formed between the reduced inner portion of the guide and spacer member 270 and the outer cylindrical portion 276 of the guide and spacer member. Thus, the secondary closure member 280 is held against movement away from the position shown with relation to the outlet opening 210 in the body until the primary closure member has moved upwardly sufficiently to dispose the annular shoulder locking of the arcuate recess 264 formed in the closure member and the operating piston 250 in alignment with the locking balls 293 and until the inner end 234a of the outlet opening 234 engages the inner closed end 286 of the secondary closure member 280, at which time the outlet passage 234 in such primary closure member is closed by such abutting engagement of the secondary closure member and primary closure member.

Further movement of the primary closure member cams the latching balls 293 outwardly, along the camming surface 275 into engagement with the annular shoulder in the arcuate locking recess 264 and locks the secondary closure member to the primary closure member by virtue of the locking balls being held in engagement with said annular locking shoulder by the external cylindrical surface 276 of the guide and spacer member. The locking balls, locking recess and secondary closure member are then in the position shown in FIG. 13 with respect to the outlet opening 235 of the primary closure member. The juncture line between the abutting surfaces of the secondary closure member and the primary closure member moves past the engaging surfaces of the O-rings 241 while in close abutting engagement to prevent deformation, destruction and damage to the O-rings by the fluid pressure differential acting thereacross. The secondary closure members 280 and 283 at each end of the primary closure member function in the same identical manner, but move in opposite directions and effect the opposite opening or closing movement with respect to each other, so that one opens while the other closes during movement of the closure assembly from one position to the other.

For actuating the closure assembly, operating fluid pressure is introduced through the conduit 221 into the bore 215b and the cap 215 to act on the operating piston 250 to move the piston inwardly toward the bore of the housing or body of the valve to the position shown in FIG. 13. Conversely, operating fluid pressure introduced through the conduit 223 into the bore 216b of the closure cap 216 forces the operating piston 283 therein to move the primary closure member and the secondary closure members associated therewith longitudinally of the valve housing or body from the position in which the closure surface 232 closes the outlet port 211 to the position in which said closure surface 232 is disposed to close the outlet opening 210, while the operating piston in the cap 215 is moved toward the operating fluid inlet 220 until the end of the operating piston 280 engages the closed end of the cap to limit further movement of the piston and the primary closure member in the valve body.

Obviously, the operating fluid pressures may be so controlled that the planar closure surface 232 of the primary closure member is disposed in a desired position partly opening and partly closing each of the outlet openings 210 and 211, and so proportion flow of fluids from the inlet opening 207 through the outlet openings 210 and 211 in any desired manner. Also, the primary closure member may be moved to a position to close either of said outlet openings as desired. It will thus be seen that this form of the valve is particularly adapted to use for process control, in fluidic computers, or the like where there is a need for throttling flow, proportioning flow, or otherwise controlling flow, and wherein a positive closure or shut-off of flow is necessary, with no leaks, at either high or low operating pressures, without deterioration of effectiveness of the seal acting against the valve closure.

It will therefore be seen that in all forms of the sliding gate type valve heretofore described, the sliding primary closure member is movable between open and closed positions with respect to the flow passage in the valve body, and that the primary and secondary closure members are movable with respect to each other to a position in which the secondary closure member abuts the primary closure member to close the flow aperture or opening therethrough before the line of juncture of the abutting portions of the primary closure member and secondary closure member passes across the engaging surfaces the O-rings or other soft seal members sealing between the primary closure member and the body of the valve in moving between open and closed positions, and so prevent deterioration of the effectiveness of the seal.

The invention is equally adapted to rotatable plug valves, as well as to slidable gate type valves of the character just described. In FIGS. 18 through 22, a spherical rotatable plug valve 300 is shown having a rotatable spherical primary closure member 301 rotatable in the bore 302 of a bell-shaped valve body 303 having an inlet passage 304 communicating with the bore 302 in the body. The ball closure 301 is rotatably confined in the bore 302 in the body 303 by means of a tubular closure and retaining member 310 provided with external screw threads 311 and threaded into a threaded counterbore 307 in the open end or mouth of the bell-shaped body 303. The tubular closure and retaining member 310 coacts with the bell-shaped housing 303 to retain the primary ball closure therein for rotation about an axis transverse to a diametrical flow passage 315 formed in said closure ball. A flat 316 having a keyway 317 formed therein is provided in the outer surface of the ball coaxially with the axis of rotation of the ball, and an operating stem 320 extends through an aperture 321 in the bell housing or body 303 of the valve and has an enlarged flanged inner end 322 with a key 323 engaging in the keyway in the flat on the valve ball closure, whereby rotation of the stem about its axis rotates the ball in the body about the axis transversely of the flow passage therethrough. An O-ring 325 is disposed in an internal annular recess 326 in the housing surrounding the stem 320 to seal therebetween to prevent fluid leakage therepast. In this schematic illustration, an O-ring or soft seal member 330 is disposed in an internal annular recess 331 formed in the concave seating surface 335 at the inner end of the outlet passage or opening of the tubular closure and retaining member 310. It will be seen that the ball closure 301 may thus be rotated between the open position shown in FIGS. 18 and 19 and the closed position shown in FIG. 22 wherein the imperforate portion of the spherical closure member is disposed in sealing engagement with the O-ring 330 to prevent flow from the inlet opening 304 in the housing or bell-shaped body 303 to the outlet opening 312 in the retainer and closure member 310, the O-ring sealing with the imperforate portion of such spherical closure member to prevent such fluid flow.

For protecting the soft seal or O-ring sealing between the valve body and the closure member, during movement of the ball closure member between open and closed positions, an elongate circumferentially extending arcuate flat bottomed groove or recess 340 is formed in the exterior or periphery of the spherical closure member 301 extending from one end of the transverse flow passage 315 in such closure member or ball to the opposite end of such flow passage, as clearly shown in FIGS. 18 and 20 through 22. As shown in FIG. 19, the lateral edge portions of said recess or groove are inclined outwardly at 341 and 342 with respect to the arcuate cylindrical or flat bottom 343 of said groove. An arcuate secondary closure, tongue member or leaf member 345, having a spherical external configuration 346 and an arcuate substantially cylindrical inner configuration surface 347, is slidable in the groove 340 between a position in which it closes the transverse flow passage 315 as shown in FIGS. 21 and 22, to a position in which the flow passage is open as shown in FIGS. 18 and 19. The outer surface 346 of the secondary closure member is coextensive in configuration with the spherical outer surface of the primary closure member, while the inner cylindrical surface 347 of the secondary closure member corresponds with and is complementary to the flat cylindrical surface 343 of the groove. The outer edge portions 348 of the secondary closure member are beveled to correspond to the inclined surfaces 341 and 342 of the recess, while the opposite end portions 345a and 345b of said closure member are semi-circular to conform to the substantially semi-circular end portions 344a and 344b, respectively, of the recess surrounding the ends of the flow passage 315 through the ball closure member. Thus, the beveled outer edge portions and end portions of the secondary closure member will engage the inclined surfaces 341, 342 and 344b of the recess 340 in the ball closure member when said secondary closure member is moved to the end of groove therein overlapping the end of the flow passage therethrough. It will be seen that when the secondary closure member is in the position in which the semi-circular end 345b thereof abuts the arcuate semi-circular inclined end portion 344b of the groove, as shown in FIGS. 21 and 22, the secondary closure member abuts the adjacent inclined portions of the groove throughout the area of the groove in the ball closure member at such end of the flow passage through the ball, and that such abutting surfaces may be moved past the engaging surfaces of the O-ring or soft seal without damaging such seal member as a result of fluid pressure differential thereacross.

For locking the secondary closure member in the position in which the flow passage through the ball primary closure member 301 is open, as shown in FIG. 18, a locking or latching pin 360 is slidable in a radial opening 361 in the secondary closure member near the arcuate end 345a thereof. The inner end of the latching pin has a bevel 362 and such inner end rides along the flat bottom 343 of the recess 340 and holds the opposite outer end of the pin in projecting position engaged in a locking or latching recess 370 formed in the bore 302 of the bell shaped body 303 of the valve. The locking recess has a bevel or inclined surface 371 which is disposed to coact with the bevel 363 of the outer end of the pin for camming the pin inwardly when the ball closure member has been rotated sufficiently to move a latching recess 380 formed in such closure member into alignment with the inner end of the latching pin, at which time the end surface 344b of the groove 340 abuts the end surface 345b of the secondary closure member. The camming force of the beveled end of the pin and the beveled shoulder 371 in the recess 370 forces the pin longitudinally inwardly of the aperture 361 in the secondary closure member and into the latching recess 380 in the ball closure member to lock the primary and secondary closure members together for conjoint movement. Further movement of the ball closure member toward open position thus moves the secondary closure member therewith to move juncture line of the abutting end surfaces 344b of the groove in the ball and 345b at the end of the secondary closure member past the inner engaging surfaces of the O-ring or seal member 330. The primary and secondary closure members thus move together from the position shown in FIG. 21, wherein the inner end of the pin 360 is held engaged in the recess 380 in the ball closure member by the engagement of its outer end with the wall of the bore 302 of the body for latching the secondary closure member to the ball primary closure member, to the position shown in FIG. 22 wherein the ball closure member 301 has been turned to fully closed position to move the juncture line of the abutting surfaces of the primary closure member and secondary closure member past the soft O-ring seal member and the imperforate portion of the ball primary closure member into full engagement with seal ring 330.

Similarly, turning the ball closure member in the opposite direction, counter clock wise in FIG. 22, will move the secondary closure member 345 with the ball closure member because of the engagement of the outer end of the pin 360 with the inner wall of the bore 302 of the body 303 of the valve, which holds the inner end of the pin engaged in the recess 380 in the ball closure member until the ball closure member and secondary closure member have been rotated to move the abutting portions thereof past the O-ring soft seal 330 to the position shown in FIG. 21, wherein the lock pin is disposed in alignment with the locking recess 370 in the body and the beveled inner end of the pin is engaged by the beveled shoulder or surface 381 of the locking recess 380 in the ball member to move it outwardly into the locking recess 370 in the housing. The pin is then held engaged in the body locking recess 370 by engagement of the inner end of the pin with the flat bottom 343 of the recess 340 in the ball primary closure member as said ball further rotated toward open position, and so prevents further movement of the secondary closure member and permits the ball primary closure member to be moved to the fully open position shown in FIG. 18.

It will therefore be seen that all advantages of the forms of the invention previously described are present in this form, wherein a ball type rotary plug closure member has the seal protecting structure of the invention incorporated therein.

FIG. 23 shows a rotary plug valve closure member 400 having a cylindrical rotary plug form of primary closure member and having a secondary closure member or tongue 402 slidable in a recess 403 formed therein for movement between positions opening and closing the transverse flow passage 405 through the rotary plug in the same manner as the form just described. Other than having a cylindrical external configuration rather than a spherical shape, this valve is constructed and functions in identically the same manner as the form of the rotary plug valve just described.

A further modified form of rotary plug valve is shown in FIG. 24, wherein a tapered plug primary closure member 410 is shown, having a slidable secondary closure member or tongue 412 slidable in a groove 413 formed in the exterior surface of the tapered plug body or closure member 410 for closing the transverse flow passage 415 therethrough. Other than having a tapered substantially cylindrical conical external configuration, the rotary plug closure member of this form of the device is also identical with the functions in identically the same manner as the forms of rotary plug members previously described.

It will therefore be seen that rotary plug valves of spherical, cylindrical, or tapered plug type are readily adaptable for incorporation of a secondary closure member therein for use in cooperation with the primary closure member to prevent damage to the soft seals or O-rings sealing between the plug closure member and the body of the valve.

FIGS. 25 and 26 illustrate a valve 500 which is a further modification of the rotary plug valve closure member. In the valve 500, a rotary plug closure member 501 is rotatable in the bore 502 of the valve body 503 for closing the flow passages 504 and 505 therethrough. An O-ring soft seal member 506 is disposed in an internal annular recess 507 surrounding the flow passage 504 in the valve body, and an O-ring soft seal member 508 is disposed in an internal annular recess 509 surrounding the flow passage 505 in the body of the valve. The primary closure member 501 has a transverse flow passage 510 therethrough which is adapted to be moved from a position in which it is in flow communication with the flow openings 504 and 505 in the body, as shown in FIG. 25, to a position in which imperforate peripheral portions of the rotary closure member are disposed in sealing engagement with the O-rings 506 and 508 to close off all flow in either direction through the valve, as shown in FIG. 26. A first secondary closure member or means 520 is shown in a groove 515 at one end 510a of the flow passage 510 in the closure member for closing that end of the passage as the abutting portions of the secondary closure member and primary closure member move past the O-ring soft seal 508 from the open position to the closed position and from the closed position to the open position.

A latching pin 521 is slidable longitudinally in a radial opening 522 in the secondary closure member and its inner end is engageable in a locking recess 523 formed in the rotatable closure member 501, as shown in FIG. 26, for locking the secondary closure member to the primary closure member for conjoint movement of said members to move the line of juncture or the abutting portions thereof past the O-ring 508. The lock or latching pin is held in the locking recess by the interior concave bore 502 of the body 503 until the pin moves into alignment with the locking recess 525 in the bore of the body, whereupon the pin is cammed outwardly into such body locking recess 525 by the camming action of the beveled inner end 526 of the latching pin with the cam surface 524 of the locking recess 523 in the closure member. The outer end of the latching pin is thus moved into the locking recess 525 in the body, as shown in FIG. 25, to prevent further movement of the secondary closure member as the rotary primary closure member is moved to the open position shown in FIG. 25. A second secondary closure member or means 540 is provided in a groove 530 on the exterior of the closure member adjacent the opposite end 510b of the flow passage 510 through the valve as the valve is moved with respect to the flow opening 505 in the body. The construction and operation of the second secondary closure member 540, the primary closure member 501, the latching pin 541, and the locking recesses 543 and 545 are identical with those of the first secondary closure member 520 and function to lock the second secondary closure member 540 to the primary closure member for closing the adjacent end 510b of the bore 510 in the primary closure member while the line of juncture of the abutting portions of the primary closure member and secondary closure member are moved past the engaging surface of the seal member 506 from the closed position shown in FIG. 26 to the open position shown in FIG. 25. Similarly, the latch pin 541 will lock the secondary closure member to the body 503, in the position shown in FIG. 25, against movement until the primary closure member has been moved to move the locking recess 543 therein into alignment with the inner end of the locking pin 541 whereupon the inner end of the pin is cammed longitudinally inwardly into locking engagement in said recess to lock the secondary closure member and primary closure member together for conjoint movement of the abutting end portions thereof closing the bore 510 at that end of said bore past the soft O-ring seal 506.

It will be seen that a rotary closure member having two secondary closure members coacting therewith may be provided in a rotary spherical or ball type closure plug, in a cylindrical rotary closure plug, or in a tapered closure plug of the types already described, if desired.

It is also believed readily apparent that a multiport rotary plug valve 600, illustrated in FIGS. 27 through 30, may be provided with a body 601 having an inlet 602 and two separate outlets 603 and 604 formed therein. The ball-like primary closure member 605 of the rotary plug type is shown as a spherical type closure member having a central blind opening 606 and three radially extending flow openings 607, 608 and 609 communicating with said central opening. As shown, the opening 607 communicates with the inlet opening 602 while the flow openings 608 and 609 communicate with the outlet openings 603 and 604, respectively, in the body on rotation of the rotary primary closure member 605 with respect to the body.

The rotary closure member 605 is rotatable in the substantially spherical bore 610 of the body 601 which is shown as composed of two sections joined together by welding, bolts, or the like, and having seal means, shown as an O-ring 612, disposed in an internal recess between the body members for preventing fluid leakage from within the bore 610 to the exterior of the body. An O-ring or soft seal member 620 is disposed in an internal annular recess 621 formed in the bore of the body surrounding the outlet opening 603 from the bore of the body to the exterior thereof, and is adapted to seal against the imperforate closure portion 615 of the plug primary closure member to shut off flow through the outlet 603 when such imperforate section is disposed in sealing engagement with said O-ring, as shown in FIG. 28.

Another O-ring or soft seal member 630 is disposed in an internal annular recess 631 formed in the bore 610 of the body surrounding the outlet opening 604 therein, and is disposed to be engaged by the imperforate closure portion 615 of the rotary closure member when said closure member is moved to dispose such imperforate portion in engagement with said seal ring 630 to close off flow from the inlet 602 through the valve and outwardly through the outlet opening 604, as shown in FIG. 27.

A radially extending lateral opening 640 is formed in the body 601 extending transversely through one wall of the body perpendicular to the plane in which the flow passages 607, 608 and 609 are disposed, and into the opposite body wall. An operating stem 642 is disposed in the radial opening and has a flanged inner end 643 having a key 644 thereon engageable with the flattened key surface 617 of the ball-like closure member 605 and a key slot 618 formed therein for rotation of the ball member by the stem. A thrust bearing 650 having a central boss 651 is disposed in the bore 610 of the body with the boss engaged in the inner end portion 641 of the transverse opening 640 in the body, and such bearing supports the ball valve for rotary movement by the stem with reduced friction. A seal ring or O-ring 653 is disposed in an internal annular groove 654 formed in the bore 640 and surrounds the stem to seal between the stem and the body to prevent fluid leakage out of the body past the stem through the opening 640.

As will be seen, the imperforate closure portion 615 of the rotary plug closure member 605 is movable between the position shown in FIG. 27 and the position shown in FIG. 28 to close the outlet openings 603 and 604, respectively. To effect such movement, without damaging the O-ring seals, a first secondary closure member 660 is disposed in a circumferentially extending arcuate slot 655 formed in the periphery of the ball-like closure member. The slot has a flat substantially cylindrical bottom surface 656 and upstanding side walls 657 and 658. The ends 655a and 655b of the recess surrounding the outlet openings 608 and 609 are preferably semi-circular in configuration, in the same manner as of those of the ball valve closure member shown in FIGS. 18 through 22, and the two secondary closure members function with respect to the outlet openings 608 and 609 in the ball closure member 605 in the same manner as in that form of ball valve.

The first secondary closure member 660 is slidable in the groove 655 between the inlet opening 607 and the outlet opening 608 for co-acting with the outlet opening 608, and a latching pin 661 is slidable in the radially extending aperture 662 formed in said first secondary closure member near the end 660b thereof and the pin engageable at its inner end in a locking recess 665 formed in the ball closure member and its outer end in a locking recess 666 formed in the bore wall of the valve body. The end 660b of the first secondary closure member adjacent the inlet opening 607 in the body is shown as being beveled or undercut, but is never moved into position closing the inlet opening 607 in the ball member. When the ball is in the position shown in FIG. 27, the outlet opening 608 in the primary closure member is in communication with the outlet opening 603 in the valve body, while the closure portion 615 of the rotary primary closure member 605 is in position closing the outlet opening 604 by its engagement with the seal ring 630. As the valve closure member is rotated in the opposite direction, from the position shown in FIG. 27 toward the position shown in FIG. 28, a second secondary closure member 670, which is also slidably disposed in the recess 655, is moved from the position shown in FIG. 27 wherein it is locked to the primary closure member by engagement of the locking pin 671 in the lock recess 675 in the rotary primary closure member with one end 670a of said closure member engaging the end 655b of the slot and closing the outlet opening 609 in said closure member to the position shown in FIG. 28, wherein the outer end of the lock pin 671 engages in the lock recess 676 in the body and latches said second secondary closure member to the valve body for preventing movement thereof while the primary closure member is moved further to close the outlet opening 603 by engagement of the imperforate portion 615 with the seal ring 620. In this position of the valve, the first secondary closure member 660 is disposed with its end 660a in abutting engagement with the end portion 655a of the slot 655 in the primary closure member surrounding the outlet opening 608, and such first secondary closure member 660 is latched to the rotary ball primary closure member for movement therewith by the lock pin 661 engaged at its inner end in the lock recess 665 in the ball. The secondary closure member in each case moves past the seal member at the opening with which it is associated while in a position in abutment with the portion of the primary closure member surrounding the outlet opening with which such secondary closure member is associated to move the line of juncture of such primary and secondary closure members past the seal member while such portions of the closure members are in such abutting position closing the outlet openings in the closure members. As a result, the closure assembly is moved with respect to the seal member with the openings thereof closed by the adjacent coacting secondary closure member to prevent damage to the soft seal member or O-ring as such movement occurs.

Therefore, the function of the secondary closure members in this form of the device is identical with the functioning of the secondary closure members of the forms previously described, cooperating with the primary closure member to close the openings in said primary closure member for movement past the seal member without damaging the seal.

It will therefore be seen that a rotary plug valve having a plurality of outlet openings in communication with an inlet opening has been provided with the secondary closure member arrangement of the invention which prevents damage to the seal members during opening and closing movements of the valve closure member.

It is particularly important to note that in all forms of the valve structure in which seals are provided between the valve body or housing and the valve closure assembly, around the flow stream, at both the inlet and outlet passages of the body, the flowing stream of fluids is confined to the flow passages of the body and closure assembly, and that turbulent and erosive flow with resultant cutting and wear damage to the valve body and closure assembly are greatly reduced or minimized. This is particularly true in the two-way valve structures such as are disclosed herein in FIGS. 1 – 12 and FIGS. 18 – 26. The abutting engaging portions of the secondary closure member and the primary closure member which provide a substantially imperforate closed surface at their line of juncture on the closure assembly, or the imperforate closure portion of the primary closure member, one or the other, at all times engage the seal member surrounding the flow stream flowing to and through the closure assembly and thus confine the flowing stream of fluids to the flow passages through the valve body and closure assembly, to greatly reduce, minimize or eliminate turbulent action of the flowing fluids on other portions of the valve than such flow passages. The life of the valves is thus prolonged and their functioning assured, reducing or eliminating the costs and difficulty of replacement of valves having cut out bodies or closures or surfaces adjacent the seals. This is important in installations in which the valve is not readily accessible, such as underwater well installations, automated remotely controlled or continuous process systems, or similar installations.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said valve closure means is in closed position to shut off fluid flow through said valve; means on said secondary closure member and said primary closure member movable to close the aperture in said valve closure means during movement of said valve closure means with respect to said seal means and disposed to provide a substantially continuous smooth imperforate closed surface on said valve closure means partly on each of said closure members movable past said seal means until a portion of said secondary closure member is exposed in said fluid flow passage of said body when said valve closure means is moved from closed to open positions.

2. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said valve closure means is in closed position to shut off fluid flow through said valve; means on said secondary closure member and said primary closure member movable to close the aperture in said valve closure means during movement of said valve closure means with respect to said seal means and disposed to provide a substantially continuous smooth imperforate closed surface on said valve closure means movable with respect to said seal means until said secondary closure member is no longer exposed in said fluid flow passage of said body when said valve closure means is moved from open to closed positions.

3. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said valve closure means is in closed position to shut off fluid flow through said valve; said secondary closure member and said primary closure member when moved to close the aperture in said valve closure means having means providing a substantially continuous smooth imperforate closed surface on said valve closure means movable past said seal means until a portion of said secondary closure member is exposed in said fluid flow passage of said body during movement of said valve closure means from closed to open position, and until said secondary closure means is no longer exposed in said flow passage during movement of said valve closure means from open to closed position.

4. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said valve closure means is in closed position to shut off fluid flow through said valve; said secondary closure member and said primary closure member when moved to close the aperture in said valve closure means having means providing a substantially continuous smooth imperforate closed surface on said valve closure means movable past said seal means until a portion of said secondary closure member is exposed in said fluid flow passage of said body during movement of said valve closure means from closed to open position and until said secondary closure means is no longer exposed in said flow passage during movement of said valve closure means from open to closed position, to prevent extrusion of said seal means between said body and said valve closure means during movement of the aperture portion of said valve closure means past said seal means.

5. A valve comprising: a body having a fluid flow passage therethrough; a valve closure member having an aperture therethrough disposed in said body and movable between positions opening and closing said flow passage of said body to control fluid flow through said flow passage; gate means movably mounted on said valve closure member and cooperating with said valve closure member at one end of said aperture therethrough to define a portion of said aperture; means for moving said gate means and said valve closure member relative to each other to open and close said aperture; and seal means sealing between said body and said valve closure member and gate means confining fluid flow therebetween to said flow passage in said body and said aperture in said closure member; said gate means being movable with respect to said aperture through said valve closure member prior to movement of said aperture past said seal means to provide a substantially continuous smooth imperforate external surface partly on said gate member and partly on said valve closure member at said end of said aperture for supporting said seal means to prevent extrusion thereof between said valve body and said valve closure member and gate means during movement of said valve closure member between open and closed positions.

6. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; seal means sealing between said body and said valve closure means when said valve closure means is in closed position to shut off fluid flow through said valve; said secondary closure member movably cooperating with said primary closure member to close the aperture in said valve closure means upon movement of said valve closure means with respect to said seal means to provide a substantially imperforate continuous closed surface on said valve closure means movable with respect to said seal means until a portion of said secondary closure member is exposed in said fluid flow passage of said body during movement of said valve closure means from closed to open positions; and movable lock means operable to a first position to interconnect said secondary closure means and said primary closure means in position closing the aperture through said valve closure means for movement of said aperture past said seal means and operable to a second position to hold said secondary closure means against movement and to release said primary closure means for movement with respect to said secondary closure means to open said aperture through said valve closure means to permit fluid flow through the flow passage of said body.

7. A valve comprising: a body having a fluid flow passage therethrough; valve closure means including primary and secondary closure members movable relative to each other, said valve closure means being movably disposed in said body and having an aperture there-through movable relative to the flow passage through said body between open and closed positions to control fluid flow through said flow passage; seal means sealing between said body and said valve closure means when said valve closure means is in closed position to shut off fluid flow through said valve; said secondary closure member movably cooperating with said primary closure member to close the aperture in said valve closure means upon movement of said valve closure means with respect to said seal means to provide a substantially imperforate continuous closed surface on said valve closure means movable with respect to said seal means until a portion of said secondary closure member is exposed in said fluid flow passage of said body during movement of said valve closure means from closed to open position, and until said secondary closure means is no longer exposed in said flow passage during movement of said valve closure means from open to closed position; and movable lock means operable to a first position to interconnect said secondary closure means and said primary closure means in position closing the aperture through said valve closure means for movement of said aperture past said seal means and operable to a second position to hold said secondary closure means against movement and to release said primary closure means for movement with respect to said secondary closure means to open said aperture through said valve closure means to permit fluid flow through the flow passage of said body.

8. A valve comprising: a body having a fluid flow passage therethrough; a valve closure member having an aperture therethrough disposed in said body and movable between open and closed positions to control fluid flow through said flow passage; seal means sealing between said body and said valve closure member confining fluid flow therebetween to said flow passage in said body and said aperture in said closure member; gate means movably mounted on said valve closure member and cooperating with said valve closure member at one end of said aperture therethrough to define a portion of said aperture, said gate means being movable with respect to said valve closure member to close the adjacent end of said aperture through said valve closure member prior to movement of said aperture past said seal means to provide a substantially continuous imperforate external surface on said valve closure member at said end of said aperture for supporting said seal means to prevent extrusion thereof between said valve body and said valve closure member during movement of said valve closure member between open and closed positions; and movable lock means operable to a first position to interconnect said gate means and said valve closure member in position closing the aperture through said valve closure member for movement of said aperture past said seal means and operable to a second position to hold said gate means against movement and to release said valve closure member for movement with respect to said gate means to open said aperture through said valve closure member to permit fluid flow through the flow passage of said body.

9. A valve comprising: a body having a fluid flow passage therethrough; a valve closure assembly including primary and secondary closure means movable relative to each other, said valve closure assembly being movably disposed in said body and having an aperture therethrough movable relative to the flow passage through said body between open and closed positions to control fluid flow through said flow passage; seal means sealing between said body and said valve closure assembly when said valve closure assembly is in closed position to shut off fluid flow through said valve; said secondary closure means movably cooperating with said primary closure means to close the aperture in said valve closure assembly for movement of said valve closure assembly with respect to said seal means to provide a substantially imperforate continuous closed surface on said valve closure assembly movable with respect to said seal means until a portion of said secondary closure means is exposed in said fluid flow passage of said body during movement of said closure assembly from closed to open positions; means providing a first recess stationary with respect to said primary closure means and said secondary closure means; means providing a second recess in said primary closure means movable with said primary closure means; and movable lock means carried by said secondary closure means and alternately engageable in locking relationship in said first recess and said second recess for alternately connecting said secondary closure means to said means providing said stationary recess to hold said secondary closure means against movement with said primary closure means to permit said primary closure means to move with respect to said secondary closure means to open position and to engage in said second recess to connect said secondary closure means to said primary closure means in a position closing the aperture therethrough so as to be movable with said primary closure means to closed position closing the flow passage through the body.

10. A valve comprising: a body having a fluid flow passage therethrough; a valve closure assembly including primary and secondary closure means movable relative to each other, said valve closure assembly being movably disposed in said body and having an aperture therethrough and movable relative to the flow passage through said body between open and closed positions to control fluid flow through said flow passage; seal means sealing between said body and said valve closure assembly when said valve closure assembly is in closed position to shut off fluid flow through said valve; said secondary closure means movably cooperating with said primary closure means to close the aperture in said valve closure assembly for movement of said valve closure assembly with respect to said seal means to provide a substantially imperforate continuous closed surface on said valve closure assembly movable with respect to said seal means until a portion of said secondary closure means is exposed in said fluid flow passage of said body during movement of said valve closure assembly from closed to open position, and until said secondary closure means is no longer exposed in said flow passage during movement of said valve closure assembly from open to closed position; means providing a first recess stationary with respect to said primary closure means and said secondary closure means; means providing a second recess in said primary closure means movable with said primary closure means; and movable lock means carried by said secondary closure means and alternately engageable in locking relationship in said first recess and said second recess for alternately connecting said secondary closure means to said means providing said stationary recess to hold said secondary closure means against movement with said primary closure means to permit said primary closure means to move with respect to said secondary closure means to open position and to engage in said second recess to connect said secondary closure means to said primary closure means in a position closing the aperture therethrough so as to be movable with said primary closure means to closed position closing the flow passage through the body.

11. A valve comprising: a body having a fluid flow passage therethrough; a valve closure assembly including primary and secondary closure means movable relative to each other, said primary closure means being movably disposed in said body and having an aperture movable between open and closed positions to control fluid flow through said flow passage; seal means sealing between said body and said valve closure assembly confining fluid flow therebetween to said flow passage in said body and said aperture in said valve closure means; said secondary closure means being movably mounted relative to said primary closure means of said valve closure assembly and cooperating with said primary closure means to define a portion of said aperture therethrough; means for moving said secondary closure means with respect to said primary closure means to close said aperture through said primary closure means prior to movement of said aperture past said seal means to provide a substantially continuous imperforate smooth external surface on said valve closure assembly at said aperture for supporting said seal means to prevent extrusion thereof between said valve body and said valve closure assembly during movement of said valve closure assembly between open and closed positions; means providing a first recess stationary with respect to said primary closure means and said secondary closure means; means providing a second recess in said primary closure means movable with said primary closure means; and movable lock means carried by said secondary closure means and alternately engageable in locking relationship in said first recess and said second recess for alternately connecting said secondary closure means to said means providing said stationary recess to hold said secondary closure means against movement with said primary closure means to permit said primary closure means to move with respect to said secondary closure means to open position, and to engage in said second recess to connect said secondary closure means to said primary closure means in a position closing the aperture therethrough so said secondary closure means is movable with said primary closure means to closed position closing the flow passage through the body.

12. A valve comprising: a body having a fluid flow passage therethrough; valve closure means including primary and secondary closure members movable relative to each other, said valve closure means being movably disposed in said body and having aperture means therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member movably cooperating with said primary closure member to move portions of said members into abutting engagement with each other to close the aperture means in said valve closure means and providing a smooth continuous imperforate surface at the juncture of said abutting portions for movement of said juncture of said abutting portions of said closure members past said seal means.

13. A valve of the character set forth in claim 12 wherein said secondary closure member and said primary closure member are simultaneously movable as a unit with respect to said seal means until said juncture of said abutting portions of said closure members closing said aperture is moved past said seal means.

14. A valve of the character set forth in claim 12 including: means for moving said abutting primary closure member and secondary closure members, while in abutting engagement, to move said juncture of said abutting portions past said seal means.

15. A valve of the character set forth in claim 14 wherein said means for moving said abutting primary and secondary closure members comprises means releasably locking said members together for simultaneous movement.

16. A valve of the character set forth in claim 14 wherein said means for moving said abutting primary and secondary closure members while in abutting engagement comprises fluid pressure means.

17. A valve of the character set forth in claim 12 wherein said valve closure means comprises a rotatable plug member disposed in said body member and rotatable therein to move the aperture means therethrough with respect to said flow passage to open and close said flow passage.

18. A valve of the character set forth in claim 12 wherein said valve closure means comprises a sliding gate slidable in said valve body to move the aperture means therethrough between positions opening and closing said flow passage in said body.

19. A valve as defined in claim 12 wherein said valve closure means is a slidable gate type closure.

20. A valve as defined in claim 12 wherein said valve closure means is a rotatable plug type closure.

21. A valve as defined in claim 20 wherein said rotatable plug type valve closure means is substantially spherical.

22. A valve as defined in claim 20 wherein said rotatable plug type valve closure means is cylindrical.

23. A valve as defined in claim 20 wherein said rotatable plug type valve closure means is frusto-conical tapered plug.

24. A valve of the character set forth in claim 12 wherein said flow passage in said valve body includes an inlet opening and a plurality of outlet openings, and said valve closure means is movable with respect to said inlet and outlet openings to selectively communicate the aperture means therethrough with said inlet and outlet openings to selectively control flow through the valve.

25. A valve of the character set forth in claim 24 wherein a portion of said secondary closure member of said valve closure means is movable into abutting engagement with a portion of said primary closure member to close said aperture means in said valve closure means for movement of said juncture of said abutting portions of said primary and secondary closure members past said seal means.

26. A valve of the character set forth in claim 24 wherein said closure means includes a plurality of secondary closure members each having a portion movable into abutting engagement with a portion of said primary closure member to close said aperture means in said closure means during movement of said juncture of said abutting portions of said members past said seal means.

27. A valve of the character set forth in claim 24 wherein said closure means includes a plurality of secondary closure members each movable with respect to said primary closure members to a position for movement of said secondary closure member to close said aperture means in said closure means during movement of said juncture of said abutting portions of said closure members past said seal means.

28. A valve of the character set forth in claim 12 wherein said body has an inlet opening and a plurality of outlet openings and said valve closure means is movable with respect to said inlet and outlet openings to communicate the aperture means therethrough with said inlet and a selected one of said outlet openings.

29. A valve comprising: a body having a fluid flow passage therethrough; valve closure means including primary and secondary closure members movable relative to each other, said valve closure means being movably disposed in said body and having aperture means therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member being movable relative to said primary closure member to move portions of said members into abutting engagement with each other to close the aperture means in said valve closure means and providing a smooth continuous imperforate surface at the juncture of said abutting portions for movement of said valve closure means with respect to said seal means until said juncture of said abutting portions of said closure members is moved past said seal means.

30. A valve comprising: a body having a fluid flow passage therethrough; valve closure means including primary and secondary closure members movable relative to each other, said valve closure means being movably disposed in said body and having aperture means therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member and said primary closure member being movable relative to each other to close the aperture means in said valve closure means and providing a smooth continuous imperforate surface at the juncture of said members for movement of said juncture of said members past said sealing means until a portion of said secondary closure member is exposed in said fluid flow passage of said body within said seal means and said valve closure means is in open position, and for movement of said juncture of said closure members of said valve closure means past said seal means from such open position until said secondary closure member is no longer exposed in said fluid flow passage of said body and said fluid flow passage through said body is closed.

31. A valve of the character set forth in claim 30 wherein said secondary closure member and said primary closure member of said valve closure means are movable simultaneously as a unit to move said juncture of said closure members past said seal means.

32. A valve comprising: a body having a fluid flow passage therethrough; valve closure means including primary and secondary closure members movable relative to each other, said valve closure means being movably disposed in said body and having aperture means therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member being movable relative to said primary closure member to move portions of said members into abutting engagement with each other to close the aperture means in said valve closure means and providing a smooth continuous imperforate surface at the juncture of said abutting portions of said closure members for simultaneous movement of said abutting portions of said closure members as a unit with respect to said seal means until said abutting portions of said closure members closing said aperture means through said valve closure means are moved past said seal means.

33. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member movably cooperating with said primary closure member to close the aperture of said valve closure means and to provide a substantially continuous smooth closed surface partly on each of said closure members of said valve closure means movable past said seal means until a portion of said secondary closure member is exposed in said fluid flow passage of said body within said seal means.

34. A valve comprising: a body having a fluid flow passage therethrough; a valve closure member having an aperture therethrough disposed in said body and movable between open and closed positions to control fluid flow through said flow passage; gate means movably mounted on said valve closure member and cooperating with said valve closure member at one end of said aperture therethrough to define a portion of said aperture; seal means sealing between said body and said valve closure member and gate means confining fluid flow therebetween to said flow passage in said body and said aperture in said closure member; means for moving said gate means with respect to said valve closure member to close the adjacent end of said aperture through said valve closure member and to provide a substantially continuous smooth closed surface on said valve closure member and said gate means at the juncture of said closure member and gate means movable past said seal means until a portion of said gate means is exposed in said fluid flow passage of said body within said seal means.

35. A valve comprising: a body having a fluid flow passage therethrough; valve closure means disposed in said body and movable relative to the flow passage through said body between open and closed positions to control fluid flow through said flow passage; and seal means sealing between said body and said valve closure means when said closure means is in closed position to shut off fluid flow through said valve; said valve closure means including primary and secondary closure members movable relative to each other, said primary closure member having an opening therethrough; means for moving said closure members relative to each other to open and close said opening; said secondary closure member being slidable with respect to said primary closure member and having a portion disposed to abut said primary closure member in the opening therethrough to provide a substantially continuous smooth imperforate surface on said valve closure means at the juncture of said abutting portions engageable by said seal means and movable past said seal means during movement of said valve closure means between closed and open positions.

36. A valve comprising: a body having a fluid flow passage therethrough; valve closure means disposed in said body and movable relative to the flow passage through said body between open and closed positions to control fluid flow through said flow passage; and seal means sealing between said body and said valve closure means when said closure means is in closed position to shut off fluid flow through said valve; said valve closure means including primary and secondary closure members movable relative to each other, said primary closure member having an opening therethrough; means for moving said closure members relative to each other to open and close said opening; said secondary closure member being slidable with respect to said primary closure member and having a portion disposed to abut said primary closure member in the opening therethrough to provide a substantially continuous smooth imperforate surface on said valve closure means at the juncture of said abutting portions of said closure members engageable by said seal means and movable past said seal means until a portion of said secondary closure member is exposed in said fluid flow passage of said body during movement of said valve closure means from closed to open position, and movable past said seal means until said secondary closure means is no longer exposed in said flow passage during movement of said valve closure means from open to closed position.

37. A valve as defined in claim 36, including: recess means formed in said valve body; recess means formed in said primary closure member; a transverse aperture in said secondary closure member; and an elongate transfer lock pin slidably disposed in said transverse aperture of said secondary closure member and movable between a first position wherein one end thereof engages said recess means in said primary closure member to lock said secondary closure member to said primary closure member with said secondary closure member in aperture closing position relative to said primary closure member and a second position wherein the opposite end thereof engages said recess means of said valve body to lock said secondary closure closure member to said valve body with said secondary closure member in aperture opening position relative to said primary closure member, said recess means in said valve body and said recess means in said primary closure member being formed with camming surfaces, and said transfer lock pin having cooperating beveled end surfaces formed thereon coacting with said camming surfaces; one end of said lock pin engaging said recess means in said primary closure member and its opposite end engaging the body passage in which said closure means is movable to lock said secondary closure member to said primary closure member to maintain said members in abutting position with said aperture in said primary closure member closed until said abutting portions of said members closing said aperture are moved across said seal means.

38. A valve as defined in claim 37 wherein: said one end of said lock pin is moved by the camming engagement of the bevel at such end with the camming surface of the recess means in said primary closure member to dispose its opposite end in the recess means in said valve body to release said secondary closure means from said primary closure means and lock said secondary closure means to said valve body to permit continued movement of said primary closure member with respect to said secondary closure to disengage their abutting portions and open the aperture through said closure means to permit flow through the valve.

39. A valve of the character set forth in claim 38 wherein: movement of the primary closure member in the opposite direction relative to said valve body and secondary closure member locked thereto reengages the abutting portions of said members and closes said aperture through said closure means, and continued movement of said primary closure means cams the beveled opposite end of said transfer lock pin by engagement thereof with the camming surface of the recess means in said valve body and moves said one end of said lock pin in said recess means of said primary closure member to lock said secondary closure member to said primary closure means in position closing said aperture so that continued movement of said primary closure member relative to said valve body moves said abutting portions of said closure members across said seal means to move said aperture of said valve closure means out of communication with the flow passage in said body and close said valve against fluid flow therethrough.

40. A valve comprising: a body having a fluid flow passage therethrough; valve closure means including primary and secondary closure members disposed in said body and movable between open and closed positions to control fluid flow through said flow passage, said primary closure member having an opening therethrough; means for moving said closure members relative to each other to open and close said opening of said primary closure member; seal means sealing between said body and said valve closure means confining fluid flow therebetween to said flow passage in said body and said aperture in said closure means; said secondary closure member being slidable with respect to said primary closure member and having a portion disposed to abut said primary closure member in the opening therethrough to provide a substantially continuous smooth imperforate surface on said valve closure means at the juncture of said abutting portions of said closure members engageable by said seal means for supporting said seal means to prevent extrusion thereof between said valve body and said valve closure members during movement of said valve closure members between open and closed positions.

41. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; seal means sealing between said body and said valve closure means when said closure means is in closed position to shut off fluid flow through said valve; said secondary closure member being slidable with respect to said primary closure member and having a portion disposed to abut said primary closure member in the opening therethrough to provide a substantially imperforate continuous closed surface on said valve closure means movable with respect to said seal means until a portion of said secondary closure member is exposed in said fluid flow passage of said body during movement of said valve closure means between closed and open positions; means for moving said primary and secondary closure members while in said abutting position until a portion of said secondary closure member is exposed in said fluid flow passage; and means holding said secondary closure member while said primary closure member is moved with respect thereto to open position.

42. A valve comprising: a body having a fluid flow passage therethrough; valve closure means including primary and secondary closure members movable relative to each other, said valve closure means being movably disposed in said body having an aperture therethrough and movable relative to the flow passage through said body between open and closed positions to control fluid flow through said flow passage; seal means sealing between said body and said valve closure means when said closure means is in closed position to shut off fluid flow through said valve; said secondary closure member being slidable with respect to said primary closure member and having a portion disposed to abut said primary closure member at the opening therethrough to provide a substantially imperforate continuous closed surface on said valve closure means movable with respect to said seal means until a portion of said secondary closure member is exposed in said fluid flow passage of said body during movement of said valve closure means from closed to open position, and until said secondary closure means is no longer exposed in said flow passage during movement of said valve closure means from open to closed position; means for moving said primary and secondary closure members while in said abutting position until a portion of said secondary closure member is exposed in said fluid flow passage; and means holding said secondary closure member while said primary closure member is moved with respect thereto to open position.

43. A valve comprising: a body having a fluid flow passage therethrough; valve closure means including primary and secondary closure members disposed in said body and movable between open and closed positions to control fluid flow through said flow passage; seal means sealing between said body and said valve closure means confining fluid flow therebetween to said flow passage in said body and said aperture in said closure means; said secondary closure member being slidable with respect to said primary closure member and having a portion disposed to abut said primary closure member in the opening therethrough to provide a substantially continuous imperforate external surface on said valve closure member at said end of said aperture for supporting said seal means to prevent extrusion thereof between said valve body and said valve closure member during movement of said valve closure member between open and closed positions; means for moving said primary and secondary closure members while in said abutting position until a portion of said secondary closure member is exposed in said fluid flow passage; and means holding said secondary closure member while said primary closure member is moved with respect thereto to open position.

44. A valve comprising: a body having a fluid flow passage therethrough; a valve closure means including primary and secondary closure members movable relative to each other, said valve closure means being movably disposed in said body and having an aperture therethrough movable relative to the flow passage through said body between open and closed positions to control fluid flow through said flow passage; seal means sealing between said body and said valve closure means when said closure means is in closed position to shut off fluid flow through said valve; said secondary closure member movably cooperating with said primary closure member to close the aperture in said valve closure means for movement of said valve closure means with respect to said seal means to provide a substantially imperforate continuous closed surface on said valve closure means movable with respect to said seal means until a portion of said secondary closure member is exposed in said fluid flow passage of said body during movement of said valve closure means from closed to open positions; and locking means holding said secondary closure means against movement to permit said primary closure member to move from open position towards closed position until said opening in said primary closure member is closed by said secondary closure member, said locking means being then movable to lock said primary and secondary closure members together to move said substantially imperforate surface past the seal means until said secondary closure member has been moved to a position wherein it is no longer exposed to the fluid flow passage in said body and the primary closure member is engaged with the seal means to positively close said flow passage through said valve.

45. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; seal means sealing between said body and said valve closure means when said closure means is in closed position to shut off fluid flow through said valve; said secondary closure member movably cooperating with said primary closure member to close the aperture in said valve closure means for movement of said valve closure means with respect to said seal means to provide a substantially imperforate continuous closed surface on said valve closure means movable with respect to said seal means until a portion of said secondary closure member is exposed in said fluid flow passage of said body during movement of said valve closure means from closed to open position, and until said secondary closure means is no longer exposed in said flow passage during movement of said valve closure means from open to closed position; and locking means holding said secondary closure means against movement to permit said primary closure member to move from open position towards closed position until said opening in said primary closure member is closed by said secondary closure member, said locking means being then movable to lock said primary and secondary closure members together to move said substantially imperforate surface past the seal means until said secondary closure member has been moved to a position wherein it is no longer exposed to the fluid flow passage in said body and the closure member is engageable with the seal means to positively close said flow passage through said valve.

46. A valve comprising: a body having a fluid flow passage therethrough; a valve closure member having an aperture therethrough disposed in said body and movable between open and closed positions to control fluid flow through said flow passage; seal means sealing between said body and said valve closure member confining fluid flow therebetween to said flow passage in said body and said aperture in said closure member; gate means movably mounted on said valve closure member and cooperating with said valve closure member at one end of said aperture therethrough to define a portion of said aperture, said gate means being movable with respect to said valve closure member to close the adjacent end of said aperture through said valve closure member prior to movement of said aperture past said seal means to provide a substantially continuous imperforate external surface on said valve closure member at said end of said aperture for supporting said seal means to prevent extrusion thereof between said valve body and said valve closure member during movement of said valve closure member between open and closed positions; and locking means holding said gate means against movement to permit said valve closure member to move from open position towards closed position until opening in said valve closure member is closed by said gate means, said locking means being then movable to lock said gate means and valve closure member together to move said substantially imperforate surface past the seal means until said gate means has been moved to a position wherein it is no longer exposed to the fluid flow passage in said body and said valve closure member is engaged with the seal means to positively close said flow passage through said valve.

47. A valve comprising: a body having an opening therein and passage therethrough; gate valve closure means including primary and secondary closure members movable relative to each other, said gate valve closure means being slidably disposed in said opening of said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member movably cooperating with said primary closure member to close the aperture in said valve closure means for movement of said valve closure means with respect to said seal means to provide a substantially imperforate smooth continuous closed surface on said valve closure means at the juncture of said closure members movable with respect to said seal means until said juncture is moved past said seal means and a portion of said secondary closure member is exposed in said fluid flow passage of said body during movement of said valve closure means from closed to open positions.

48. A valve comprising: a body having an opening therein and a fluid flow passage therethrough; plug valve closure means including primary and secondary closure members movable relative to each other, said plug valve closure means being rotatably disposed in said opening of said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member movably cooperating with said primary closure member to close the aperture in said plug valve closure means for rotation of said valve closure means with respect to said seal means to provide a substantially imperforate smooth continuous closed surface on said plug valve closure means at the juncture of said closure members movable with respect to said seal means until said juncture is moved past said seal means and a portion of said secondary closure member is exposed in said fluid flow passage of said body during rotation of said valve closure means from closed to open positions.

49. A valve comprising: a body having a fluid flow passage therethrough; valve closure means having an aperture therethrough disposed in said body and movable between open and closed positions to control fluid flow through said flow passage; a recess in said valve body surrounding said flow passage; seal means in said recess engaging said valve closure means for sealing between said body and said valve closure means; said valve closure means including a first valve closure member and a second valve closure member movably mounted on said first valve closure member and coacting with said first valve closure member to define said aperture through said valve closure means; means for moving said closure members relative to each other to open and close said aperture; said second valve closure member being movable with respect to said first valve closure member to abut the same to close the aperture through said valve closure means prior to movement of said aperture past said seal means to provide a substantially continuous smooth imperforate external surface on said valve closure means at the abutting juncture of said first valve closure member and said second valve closure member partly on each of said members engageable with said seal means to prevent extrusion thereof between said valve body and said valve closure means by fluid pressure at all positions of said valve closure means.

50. A valve comprising: a body having a fluid flow passage therethrough; valve closure means including primary and secondary closure members movable relative to each other, said valve closure means being slidably disposed in said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means when said closure means is in closed position to shut off fluid flow through said valve; said secondary closure member movably cooperating with said primary closure member to close the aperture in said valve closure means for movement of said valve closure means with respect to said seal means to provide a substantially imperforate smooth continuous closed surface on said valve closure means at the juncture of said closure members engageable by said seal means for enclosing and supporting said seal means to prevent extrusion of said seal means between said valve body and said valve closure means at all positions of said valve closure means between closed and open positions.

51. A valve comprising: a body having an opening therein and a fluid flow passage therethrough; a valve closure means including primary and secondary closure members movable relative to each other, said valve closure means being movably disposed in said opening of said body and having an aperture therethrough movable relative to the flow passage through said body between open and closed positions to control fluid flow through said flow passage; means for moving said valve closure members relative to each other to open and close said aperture of said valve closure means; recess means in said body surrounding said flow passage therethrough; and seal means disposed in said recess means and engaging said valve closure means for sealing between said body and said valve closure means when said closure means is in closed position to shut off fluid flow through said valve; said secondary closure member cooperating with said primary closure member at all positions of said closure means to provide a smooth continuous imperforate surface at the juncture of said closure members to confine said seal means in said recess means, said secondary closure member movably coacting with said primary closure member to close the aperture in said valve closure means for movement of said juncture of said valve closure means with respect to said seal means to provide a substantially imperforate smooth continuous closed surface on said valve closure means at said juncture of said closure members engageable by and movable with respect to said seal means between open and closed positions.

52. A valve of the character set forth in claim 51 wherein said seal means comprises a soft elastomeric or plastic seal ring.

53. A valve of the character set forth in claim 51 wherein said seal means comprises a deformable elastomeric or plastic seal means sealing at low pressure and normally flowable under high pressure, and wherein said valve closure means maintains said seal means in said recess means and prevents extrusion or flow of said seal means from said recess by fluid pressure in said passage.

54. A valve as defined in claim 51 wherein said valve closure means is a slidable gate type closure.

55. A valve as defined in claim 51 wherein said valve closure means is a rotatable plug type closure.

56. A valve as defined in claim 55 wherein said rotatable plug type valve closure means is substantially spherical.

57. A valve as defined in claim 55 wherein said rotatable plug type valve closure means is cylindrical.

58. A valve as defined in claim 55 wherein said rotatable plug type valve closure means is frustoconical tapered plug.

59. A valve comprising: a body having an opening therein and a fluid flow passage therethrough; valve closure means including primary and secondary closure members movable relative to each other, said valve closure means being movably disposed in said opening of said body and having an aperture therethrough movable relative to the flow passage through said body between open and closed positions to control fluid flow through said flow passage; means for moving said valve closure members relative to each other to open and close said aperture of said valve closure means; an annular groove in said body surrounding said flow passage in said opening; and seal means disposed in said groove and engaging said valve closure means for sealing between said body and said valve closure means when said closure means is in closed position to shut off fluid flow through said valve; said secondary closure member movably cooperating with said primary closure member of said closure means to confine said seal means in said annular groove, said secondary closure member being removable relative to said primary closure member to close the aperture in said valve closure means for movement of said valve closure means with respect to said seal means to provide a substantially imperforate smooth continuous closed surface on said valve closure means at the juncture of said closure members engageable by and movable with respect to said seal means between open and closed positions.

60. A valve of the character set forth in claim 59 wherein said seal means comprises a soft elastomeric or plastic seal ring.

61. A valve of the character set forth in claim 59 wherein said seal means comprises a deformable elastomeric or plastic seal means sealing at low pressure and normally flowable under high pressure, and wherein said valve closure means confines said seal means in said annular groove and prevents extrusion or flow of said seal means from said annular groove by fluid pressure in said passage.

62. A valve of the character set forth in claim 59 including means releasably locking said primary closure member and said secondary closure member together closing said aperture through said valve closure means for simultaneous movement of said members during movement of said juncture of said closure members past said seal means during movement of said valve closure means between open and closed positions.

63. A valve comprising: a body having a fluid flow passage therethrough; valve closure means including primary and secondary closure members movable relative to each other, said valve closure means being movably disposed in said body and having aperture means therethrough movable relative to the flow passage through said body between open and closed positions to control fluid flow through said flow passage; means for moving said valve closure members relative to each other to open and close said aperture of said valve closure means; and seal means sealing between said body and said valve closure means at all times to direct fluid flow therebetween through said flow passage in said body and said aperture in said closure means and to inhibit fluid flow from said flow passage and aperture to other portions of said valve when said closure means is in open position, and to shut off fluid flow through said valve when said closure means is in closed position; said secondary closure member movably cooperating with said primary closure member to move portions of said members into abutting engagement with each other to close the aperture means in said valve closure means and to provide a substantially continuous smooth closed surface at said juncture of said abutting portions of said closure members engageable by said seal means for movement of said juncture of said abutting portions of said primary closure member and said secondary closure member closing said aperture means past said seal means.

64. A valve comprising: a body having a fluid flow passage therethrough; valve closure means including primary and secondary closure members disposed in said body and movable between open and closed positions to control fluid flow through said flow passage, said primary closure member having an opening therethrough; means for moving said valve closure members relative to each other to open and close said aperture of said valve closure means; seal means sealing between said body and said valve closure means at all times to direct fluid flow therebetween through said flow passage in said body and said aperture in said closure means when said closure means is in open position and to substantially preclude flow from said flow passage and aperture to other portions of such valve; said secondary closure member being slidable with respect to said primary closure member and having a portion disposed to abut said primary closure member in the opening therethrough to provide a substantially continuous smooth imperforate surface on said valve closure means at the juncture of the abutting portions of said closure members engageable by said seal means for supporting said seal means to prevent extrusion thereof between said valve body and said valve closure means during movement of said juncture of said closure members past said seal means as said valve closure means is moved between open and closed positions.

65. A valve comprising: a body having a fluid flow passage therethrough; valve closure means including primary and secondary closure members movable relative to each other, said valve closure means being movably disposed in said body and having an aperture therethrough movable relative to the flow passage through said body between open and closed positions to control fluid flow through said flow passage; means for moving said valve closure members relative to each other to open and close said aperture of said valve closure means; and seal means sealing between said body and said valve closure means directing fluid flow therebetween through said flow passage in said body and said aperture in said closure means when said valve closure means is in open position and when said valve closure means is in closed position to shut off fluid flow through said valve; said secondary closure member being movable into abutting juncture with said primary closure member to close the aperture in said valve closure means upon movement of said valve closure means with respect to said seal means to provide a substantially imperforate smooth continuous closed surface on said valve closure means at said abutting juncture engageable by and movable past said seal means until a portion of said secondary closure member is exposed in said fluid flow passage of said body during movement of said valve closure means from closed to open position and movable past said seal means until said secondary closure means is no longer exposed in said flow passage during movement of said valve closure means from open to closed position, to prevent extrusion of said seal means between said body and said valve closure means during movement of the abutting juncture of said closure members at the aperture portion of said valve closure means past said seal means; said seal means engaging said valve closure means at all times to inhibit fluid flow from said flow passage of said body and said aperture of said closure means to other portions of said valve body and closure means.

66. A valve comprising: a body having an opening therein and a fluid flow passage therethrough; a valve closure means including primary and secondary closure members movable relative to each other, said valve closure means being movably disposed in said opening of said body and having an aperture therethrough movable relative to the flow passage through said body between open and closed positions to control fluid flow through said flow passage; means for moving said valve closure members relative to each other to open and close said aperture of said valve closure means; recess means in said body surrounding said flow passage therethrough; and seal means disposed in said recess means and engaging said valve closure means at all times to direct fluid flow therebetween through said flow passage in said body and said aperture in said closure means and to inhibit fluid flow from said flow passage and aperture to other portions of said valve when said closure means is in open position, and for sealing between said body and said valve closure means when said closure means is in closed position to shut off fluid flow through said valve; said secondary closure member cooperating with said primary closure member of said closure means to confine said seal means in said recess means; said secondary closure member movably coacting with said primary closure member to close the aperture in said valve closure means for movement of said valve closure means with respect to said seal means to provide a substantially imperforate smooth continuous closed surface on said valve closure means at the juncture of said closure members engageable by and movable past said seal means between open and closed positions.

67. A valve comprising: a body having an opening therein and a fluid flow passage therethrough; valve closure means including primary and secondary closure members movable relative to each other, said valve closure means being movably disposed in said opening of said body and having an aperture therethrough movable relative to the flow passage through said body between open and closed positions to control fluid flow through said flow passage; means for moving said closure members relative to each other to open and close said aperture; an annular groove in said body surrounding said flow passage in said opening; and seal means disposed in said groove and engaging said valve closure means at all times to direct fluid flow therebetween through said flow passage in said body and said aperture in said closure means and to inhibit flow from said flow passage and aperture to other portions of said valve when said closure means is in open position, and for sealing between said body and said valve closure means when said closure means is in closed position to shut off fluid flow through said valve; said secondary closure member movably cooperating with said primary closure member of said closure means to confine said seal means in said annular groove; said secondary closure member movably coacting with said primary closure member to close the aperture in said valve closure means for movement of said valve closure means with respect to said seal means to provide a substantially imperforate smooth continuous closed surface on said valve closure means at the juncture of said closure members engageable by and movable past said seal means between open and closed positions.

68. A valve comprising: a body having a fluid flow passage therethrough; a valve closure member having an aperture therethrough disposed in said body and movable between positions opening and closing said flow passage of said body to control fluid flow through said flow passage; gate means movably mounted on said valve closure member and cooperating with said valve closure member to define a portion of said aperture through said closure member; means for moving said gate means and said valve closure member relative to each other to open and close the aperture of said valve closure member; and seal means sealing between said body and said valve closure member and gate means confining fluid flow therebetween to said flow passage in said valve body and said aperture in said valve closure member; said gate means being movable with respect to said aperture through said valve closure member prior to movement of said aperture past said seal means to provide a substantially continuous imperforate smooth external surface on said valve closure member at the juncture of the gate means and closure member at said aperture for supporting said seal means to prevent extrusion thereof between said valve body and said valve closure member and gate means during movement of said juncture of said gate means and said valve closure member past said seal means between open and closed positions.

* * * * *